(12) United States Patent
Guim Bernat et al.

(10) Patent No.: US 11,625,277 B2
(45) Date of Patent: Apr. 11, 2023

(54) DYNAMICALLY AUGMENTING EDGE RESOURCES

(71) Applicant: Intel Corporation, Santa Clara, CA (US)

(72) Inventors: Francesc Guim Bernat, Barcelona (ES); Kshitij Arun Doshi, Tempe, AZ (US); Bassam N. Coury, Portland, OR (US); Suraj Prabhakaran, Aachen (DE); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 16/878,861

(22) Filed: May 20, 2020

(65) Prior Publication Data
US 2020/0285523 A1   Sep. 10, 2020

Related U.S. Application Data

(60) Provisional application No. 62/850,402, filed on May 20, 2019, provisional application No. 62/852,869, filed on May 24, 2019.

(51) Int. Cl.
| G06F 9/50 | (2006.01) |
| G06F 9/48 | (2006.01) |
| H04L 67/10 | (2022.01) |

(52) U.S. Cl.
CPC .......... *G06F 9/5044* (2013.01); *G06F 9/4843* (2013.01); *G06F 9/505* (2013.01); *G06F 9/5094* (2013.01); *G06F 9/5072* (2013.01); *G06F 2209/5011* (2013.01); *H04L 67/10* (2013.01)

(58) Field of Classification Search
None
See application file for complete search history.

(56) References Cited

U.S. PATENT DOCUMENTS

2020/0218548 A1*  7/2020  Wan ................... H04L 41/5025

* cited by examiner

*Primary Examiner* — Eric C Wai
(74) *Attorney, Agent, or Firm* — Schwegman Lundberg & Woessner, P.A.

(57) ABSTRACT

Systems and methods may be used to determine where to run a service based on workload-based conditions or system-level conditions. An example method may include determining whether power available to a resource of a compute device satisfies a target power, for example to satisfy a target performance for a workload. When the power available is insufficient, an additional resource may be provided, for example on a remote device from the compute device. The additional resource may be used as a replacement for the resource of the compute device or to augment the resource of the compute device.

24 Claims, 17 Drawing Sheets

DYNAMICALLY AUGMENTING EDGE RESOURCES

CLAIM OF PRIORITY

This application claims the benefit of priority to U.S. Provisional Applications Nos. 62/850,402, filed May 20, 2019, titled "TECHNOLOGIES FOR DYNAMICALLY AUGMENTING EDGE RESOURCES"; and 62/852,869, filed May 24, 2019, titled "EXECUTION OF SERVICES WITH VARIABLE POWER AVAILABILITY." each of which is hereby incorporated herein by reference in its entirety.

BACKGROUND

A new era of compute is emerging in which intensive compute operations are no longer performed primarily in data centers at the core of a network. Rather, with new data transport technologies, such as 5G and new types of fabrics (e.g., network architectures), compute resources may be placed in locations that are remote from a conventional data center. For example, compute resources may be available both in cell towers, base stations, and central offices. Furthermore, given their remote placement (e.g., remote from the core of a network), many of the compute devices that will perform the compute operations may obtain power from solar cells (photovoltaic cells), wind turbines, or other sources that may provide a smaller and less reliable supply of power than a connection to a power distribution grid. As such, the compute capacity at the remote compute locations may fluctuate with the availability of power, leading to an inability to guarantee a fixed level of performance (e.g., a target quality of service, such as a target latency, a target throughput, and/or other performance metrics that may be specified in a service level agreement between a user (client) of the compute resources and a provider of the compute resources).

Edge computing is a fast emerging paradigm in which data processing and delivery are situated closer to users such as in base stations, cell towers, central offices, etc. In its essence, the edge cloud for users is not just one location but is a cloud ecosystem consisting of multiple layers of computing environments at different locations. For example, computing resources would be available in both cell towers and central offices, with computing capabilities that may be similar in some respects and very different in others (e.g., max/average power, predictable power availability, amount of reserve power, and, correspondingly, the amounts of resource bandwidths and utilizations that can be supported).

An example workload in edge cloud is Content Delivery Network (CDN) services, using edge cloud facilities to serve ever growing content volumes to an ever growing base of subscribers. Other typical workloads in edge cloud infrastructures include Mobile-edge or Multi-access edge computing (MEC) in which services and applications that may typically run in traditional clouds are offered also to mobile customers at low and predictable response times (for many usages including for real-time communications-based interactive purposes), and where the consumption and often even the service end-points are non-stationary.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
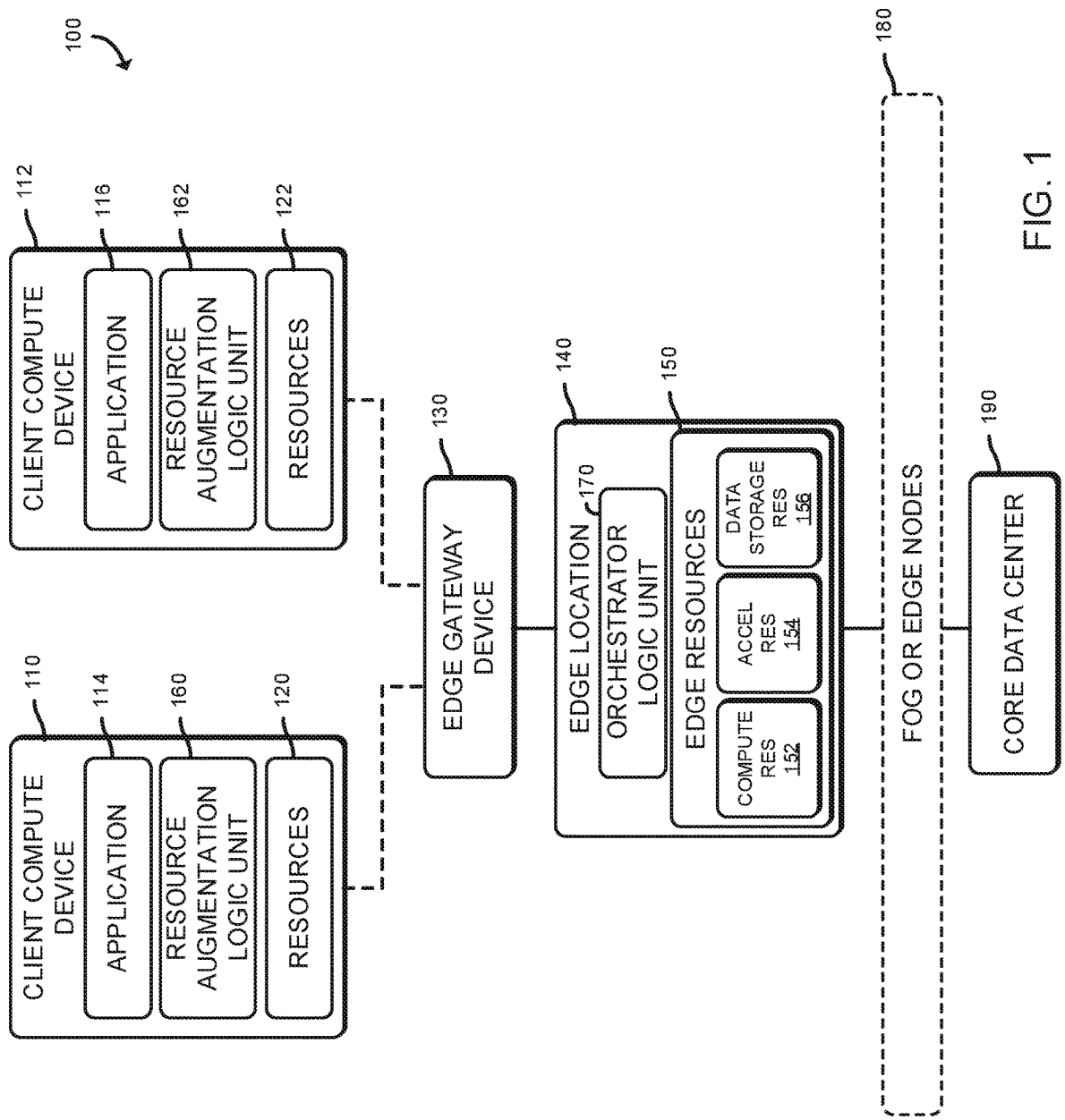
FIG. 1 is a simplified diagram of at least one embodiment of a system for dynamically augmenting the resources of a compute device in an edge environment.

Referring now to FIG. 1, a system 100 for dynamically augmenting edge resources includes client compute devices 110, 112 (e.g., a vehicle, a cellular tower, etc.) in communication with an edge gateway device 130. The edge gateway device 130 may be embodied as any device capable of communicating data between the client compute devices 110, 112 and an edge location (e.g., a base station, central office, etc.) 140 in which resources 150 (e.g., compute resources 152, accelerator resources 154, and data storage resources 156) are present. The edge gateway device 130 and the edge location 140, in the illustrative embodiment, are positioned along the edge (e.g., in an edge network) of a network (e.g., in small cell(s), base station(s), central office(s), etc.).

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/ processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 190 (e.g., a data center that is further away from and in a higher level of a hierarchy of the system 100 than the edge resources 150, and that includes multiple compute devices capable of executing one or more services (e.g., processes on behalf of one or more clients)) and an endpoint device (e.g., the client compute device 110).

As discussed in more detail herein, the client compute device 110, in operation, executes an application 114 (e.g., using a processor and/or accelerator device(s)) included in the client compute device 110. The application 114 (also referred to herein as a workload) includes multiple functions, some of which may benefit from acceleration (e.g., to provide a result within a time period that would be difficult to satisfy if the function were executed by the general purpose processor) and some of which may be difficult or impossible to perform in view of the present amount of power available at the client compute device 110. Further, in the illustrative embodiment, the client compute device 110 includes a resource augmentation logic unit 160, which may be embodied as any device or circuitry (e.g., a processor, an application specific integrated circuit (ASIC), reconfigurable circuitry, etc.) configured to register the resources 120 available on the client compute device 110 with an orchestrator logic unit 170 (e.g., in the edge location 140), continually determine whether sufficient power is available at the client compute device 110 to perform functions of the application 114, and coordinate with the orchestrator logic unit 170 to selectively utilize resources available at the edge (e.g., in the edge location 140 and/or the client compute device 112) as if those resources were local to the client compute device 110 (e.g., by tunneling local bus communications (e.g., peripheral component interconnect express communications) through a network connection (e.g., a wireless connection (e.g., 5G) or wired connection (e.g., Ethernet) to the communication circuitry associated with the requested resources). The orchestrator logic unit 170 may be embodied as any device or circuitry configured to selectively match available resources of compute devices at the edge with compute devices requesting additional resource capacity and facilitate configuring the communication circuitry of the compute devices to communicate with the resources as if they were local (e.g., connected to a local bus, such as a peripheral component interconnect express (PCIe) bus), as explained in more detail herein. While shown as being located in the edge location 140, it should be understood that in other embodiments, the orchestrator logic unit 170 may be located in any of the client compute devices 110, 112, the edge gateway device 130, and/or distributed across multiple devices. The client compute device 112 (e.g., a cellular tower) includes resources 122, similar to the resources 120 and a resource augmentation logic unit 162, similar to the resource augmentation logic unit 160. Further, the client compute device 112 may execute an application 116 that may include functions that, in view of the present amount of power available to the compute device 112, may require the use of resources 120, 150 outside of the client compute device 112 to be completed in timely manner (e.g., in satisfaction of a target throughput, latency, or other quality of service metric defined in a service level agreement).

Figure 2:
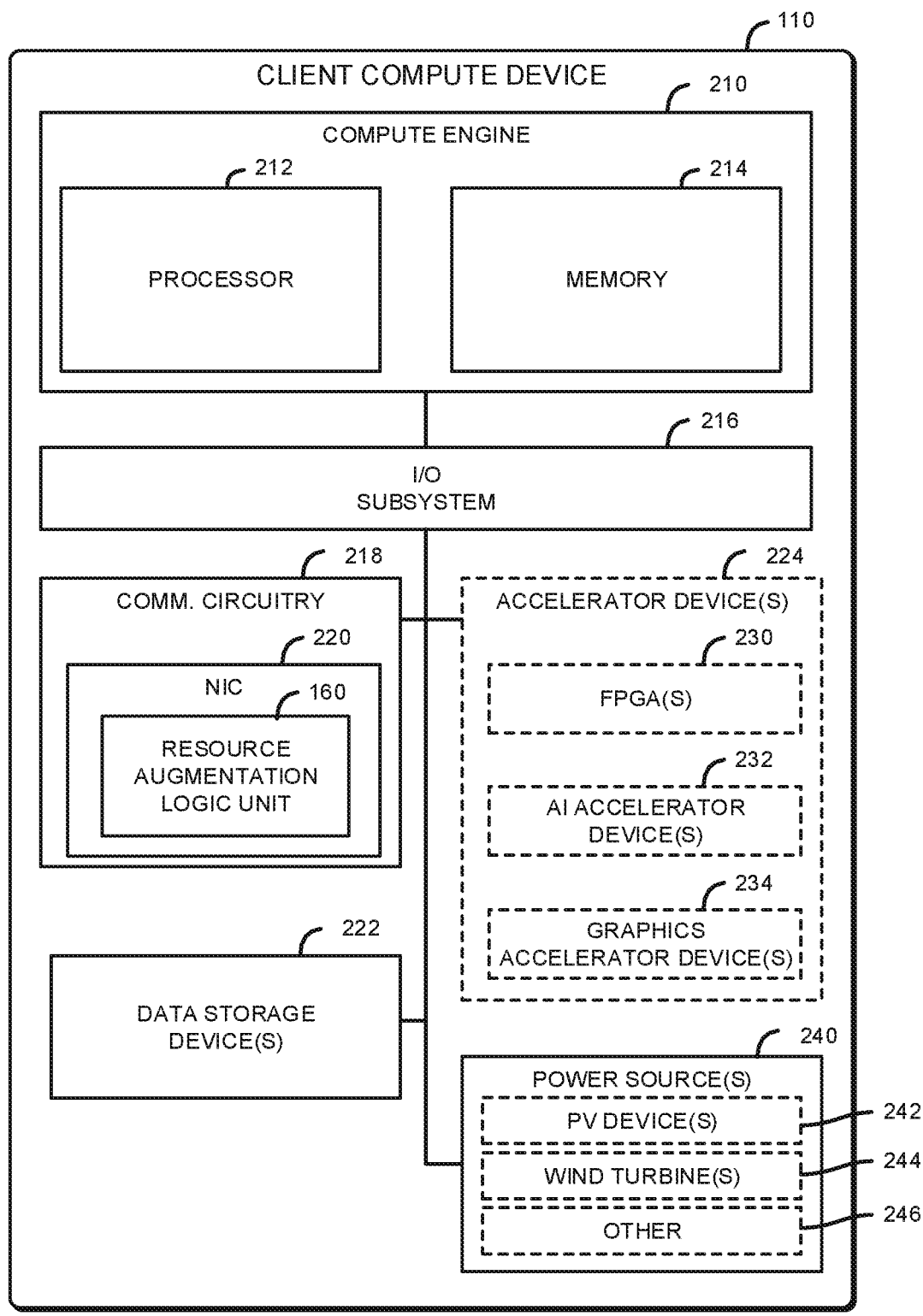
FIG. 2 is a simplified block diagram of at least one embodiment of a client compute device included in the system of FIG. 1.

Referring now to FIG. 2, the illustrative client compute device 110 may be embodied as one or more physical devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). The client compute device 110, in the illustrative embodiment, includes a compute engine (also referred to herein as "compute engine circuitry") 210, an input/output (I/O) subsystem 216, communication circuitry 218, one or more data storage devices 222, and connection(s) to power source(s) 240. As described herein, the client compute device 110 may also include one or more accelerator devices 224. In the illustrative embodiment, the compute engine 210, the data storage device(s) 222, and the accelerator device(s) 224 are included in the resources 120 described with reference to FIG. 1. Of course, in other embodiments, the client compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein (e.g., executing the application 114). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM. JESD79-2F for DDR2 SDRAM. JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications (the application 114), data operated on by the application(s), libraries, and drivers.

The compute engine 210 is communicatively coupled to other components of the client compute device 110 via the I/O subsystem 216, which may be embodied as circuitry and/or components to facilitate input/output operations with the compute engine 210 (e.g., with the processor 212 and/or the main memory 214) and other components of the client compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the client compute device 110, into the compute engine 210.

The communication circuitry 218 may be embodied as any communication circuit, device, or collection thereof, capable of enabling communications over a network between the client compute device 110 and another device (e.g., the edge gateway device 130, the edge resources 150, the orchestrator logic unit 170, the client compute device 112, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the client compute device 110 to connect with another device (e.g., the edge gateway device 130, the edge resources 150, the orchestrator logic unit 170, the client compute device 112, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the client compute device 110 at the board level, socket level, chip level, and/or other levels. In the illustrative embodiment, the resource augmentation logic unit 160 is included in the NIC 220. However, in other embodiments, the resource augmentation logic unit 160 may be located in another component of the client compute device 110.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include an artificial intelligence accelerator 232, which may be embodied as any device or circuitry (e.g., a programmable logic chip, a processor, etc.) configured to perform artificial intelligence related operations (e.g., matrix multiplication, vector operations, machine learning training operations, machine learning inference operations, etc.). Additionally or alternatively, the accelerator device(s) 224 may include a graphics accelerator 234, which may be embodied as any device or circuitry (e.g., a programmable logic chip, a processor, etc.) configured to perform graphics processing operations. Additionally or alternatively the accelerator device(s) 224 may include other types of devices, such as one or more application specific integrated circuits (ASICs).

The power sources 240 may be embodied as any devices capable of providing electrical power to the components of the client compute device 110 and may include one or more photovoltaic devices (e.g., solar cells) 242, wind turbine(s) 244, or other sources 246. The production of power from the sources 240 may vary over time, due to environmental conditions (e.g., the availability of sunlight and/or wind, or other factors).

The client compute device 112, the edge gateway device 130, the edge location 140, the fog nodes 180, and the core data center 190 may have components similar to those described in FIG. 2 with reference to the client compute device 110. The description of those components of the client compute device 110 is equally applicable to the description of components of the client compute device 112, the edge gateway device 130, the edge location 140, the fog nodes 180, and the core data center 190. Further, it should be appreciated that any of the client compute device 112, the edge gateway device 130, the edge location 140, the fog nodes 180, and the core data center 190 may include other components, sub-components, and devices commonly found in a computing devices, which are not discussed above in reference to the client compute device 110 and not discussed herein for clarity of the description. Further, it should be understood that one or more components of a compute device may be distributed across any distance, and are not necessarily housed in the same physical unit.

The client compute devices 110, 112, the edge gateway device 130, the edge location 140, the fog nodes 180, and the core data center 190 are illustratively in communication via a network, which may be embodied as any type of wired or wireless communication network, or hybrids and combinations thereof, including global networks (e.g., the Internet), local area networks (LANs) or wide area networks (WANs), an edge network, a fog network, cellular networks (e.g., 5G, Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
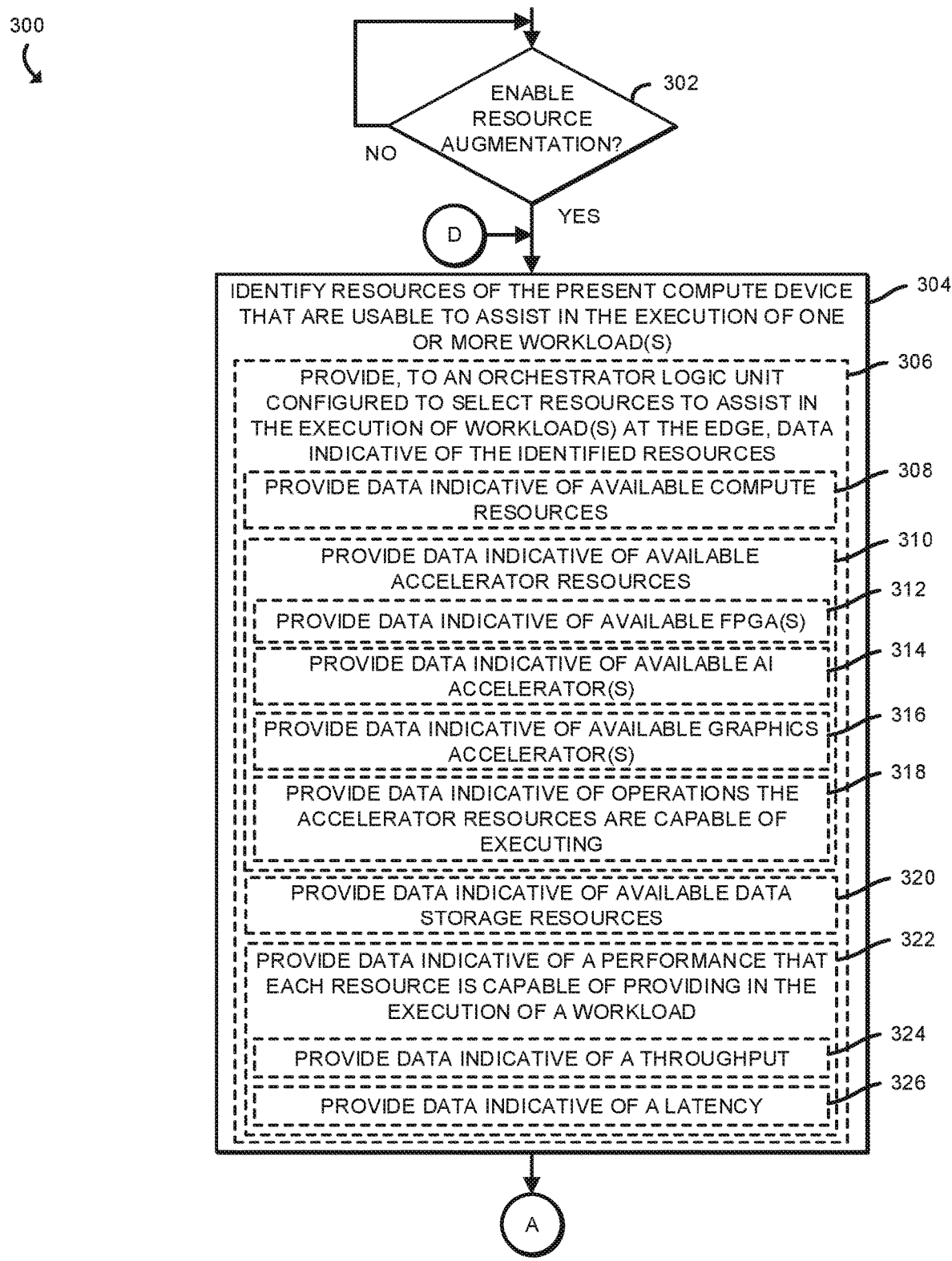
FIG. 3-6 are simplified block diagrams of at least one embodiment of a method for augmenting the resources of a compute device in an edge environment.

Referring now to FIG. 3, the client compute device 110, in operation, may execute a method 300 for dynamically augmenting the resources available to the client compute device 110 (e.g., with one or more of the resources 150, 122). The method 300 begins with block 302 in which the client compute device 110 determines whether to enable dynamic resource augmentation. In doing so, the client compute device 110 may determine to enable dynamic resource augmentation in response to a determination that the client compute device 110 is equipped with the resource augmentation logic unit 160. In other embodiments, the client compute device 110 may make the determination based on other factors. Regardless, in response to a determination to enable dynamic resource augmentation, the method 300 advances to block 304, in which the client compute device 110 identifies resources of the client compute device 110 that are usable to assist in the execution of one or more workloads. In doing so, and as indicated in block 306, the client compute device 110, in the illustrative embodiment, provides, to an orchestrator logic unit (e.g., the orchestrator logic unit 170) configured to select resources to assist in the execution of workloads at the edge, data indicative of the identified resources. For example, and as indicated in block 308, the client compute device 110 may provide data indicative of available compute resources (e.g., the processor 212). Additionally, the client compute device 110 may provide data indicative of available accelerator resources (e.g., the accelerator device(s) 224), as indicated in block 310. In doing so, the client compute device 110 may provide data indicative of available FPGAs (e.g., the FPGA(s) 230), as indicated in block 312. Additionally or alternatively, the client compute device 110 may provide data indicative of available artificial intelligence accelerators (e.g., the AI accelerator device(s) 232), as indicated in block 314. As indicated in block 316, the client compute device 110 may provide data indicative of available graphics accelerators (e.g., the graphics accelerator device(s) 234). In providing data indicative of the available accelerator resources, the client compute device 110 may also provide data indicative of the operations the accelerator resource are capable of executing (e.g., data indicative of kernels that have been loaded on the accelerator device(s) 224, data indicative of the architectures of the accelerator devices 224, which may be indicative of the types of operations the accelerator devices are capable of performing more efficiently than a general purpose processor, etc.), as indicated in block 318. The client compute device 110 may also provide data indicative of available data storage resources (e.g., the data storage device(s) 222), as indicated in block 320. Additionally, in providing the data indicative of the available resources, the client compute device 110 may provide data indicative of a performance that each resource is capable of providing in the execution of a workload, as indicated in block 322. In doing so, the client compute device 110 may provide data indicative of a throughput (e.g., operations per second) that a given resource is capable of performing, as indicated in block 324. Additionally or alternatively, the client compute device 110 may provide data indicative of a latency associated with (e.g., an amount of time consumed by) a given resource to perform a particular operation, as indicated in block 326.

Figure 4:
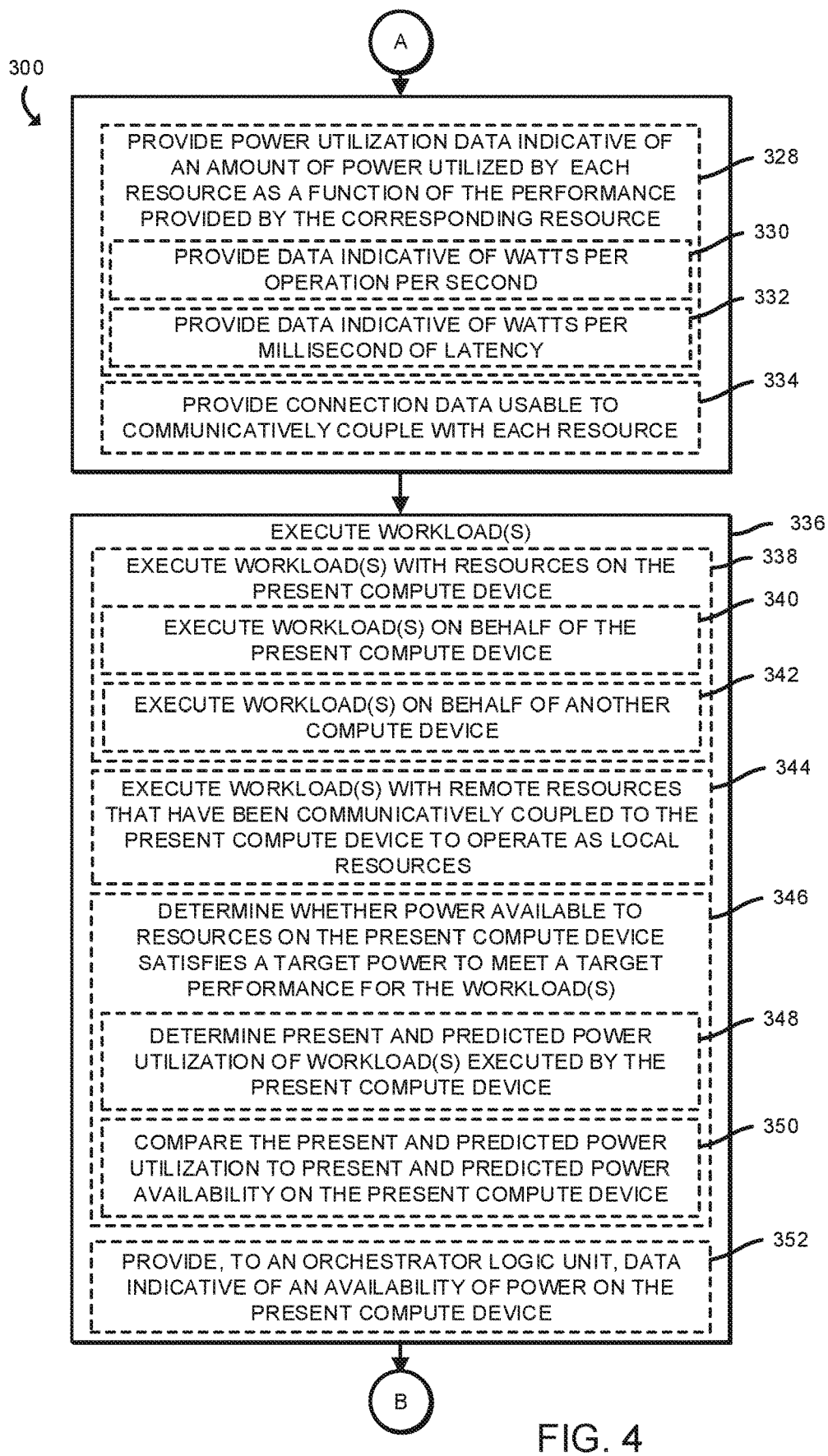

Referring now to FIG. 4, the client compute device 110 additionally or alternatively may provide power utilization data indicative of an amount of power utilized by each resource as a function of the performance provided by the resource, as indicated in block 328. For example, and as indicated in block 330, the client compute device 110 may provide data indicative of a number of Watts consumed per operation performed per second (e.g., Watts per unit of throughput), as indicated in block 330. Relatedly, and as indicated in block 332, the client compute device 110 may provide data indicative of a number of Watts per millisecond (or other unit of time) of latency required by each resource to perform a particular operation. As will be understood by those having skill in the art, a relatively lower amount of latency may require a relatively higher amount of power (e.g., Watts) to achieve, as the corresponding resource may operate at a higher voltage and/or frequency to achieve a lower latency for a given operation. Additionally, and as indicated in block 334, in the illustrative embodiment, the client compute device 110 provides, to the orchestrator logic unit 170, connection data usable to communicatively couple with (e.g., communicate with, from a separate compute device) each resource 120 (e.g., a unique identifier or other address information usable for tunneling local bus communications (e.g., PCIe communications) through a network (e.g., via the communication circuitry 218) or via a compute express link (CXL), e.g., for high-speed processor-to-device or processor-to-memory connections).

Still referring to FIG. 4 and as indicated in block 336, the client compute device 110 executes one or more workloads. In doing so, the client compute device 110 may execute one or more workloads with resources on the present compute device (e.g., the resources 120 on the client compute device 110), as indicated in block 338. As indicated in block 340, the client compute device 110 may execute one or more workloads on behalf of the present compute device (e.g., a workload assigned to the client compute device 110), such as the application 114. Additionally or alternatively, and as indicated in block 342, the client compute device 110 may execute one or more workloads on behalf of another compute device (e.g., a portion of the application 116 assigned to the client compute device 112). As indicated in block 344, the client compute device 110 may execute one or more workloads with remote resources (e.g., the resources 150 and/or 122) that have been communicatively coupled to the present compute device (e.g., to the client compute device 110) to operate as local resources (e.g., via tunneling of local bus communications through the network). As indicated in block 346, the client compute device 110, in the illustrative embodiment, determines whether power available to the resources 120 on the present compute device (e.g., the client compute device 110) satisfies a target power to meet a target performance for the workload(s) (e.g., a target throughput defined in a service level agreement for the application 114). In doing so, and as indicated in block 348, the client compute device 110 may determine a present and a predicted power utilization of the workload(s) executed by the present compute device (e.g., by the client compute device 110) such as by comparing the power utilization and performance data from block 328 to the target performance of the workload(s) executed by the client compute device 110 and/or by identifying patterns in the power utilization associated with each workload and predicting upcoming power utilizations based on the patterns. As indicated in block 350, the client compute device 110 may compare the present and predicted power utilization of the workload(s) to present and predicted power availability on the present compute device 110 (e.g., by identifying patterns in the availability of power from the source(s) 240, such as by analyzing weather data, which may affect the ability of the source(s) 240 to produce power, etc.). As indicated in block 352, the client compute device 110 may provide, to an orchestrator logic unit 170, data indicative of an availability of capacity sufficient to execute a workload, provide a service, etc. which may include available power (e.g., present availability or predicted availability) on the present compute device (e.g., the client compute device 110). Subsequently, the method 300 advances to block 354 of FIG. 5, in which the client compute device 110 determines the subsequent course of action based on whether sufficient power is available to the client compute device 110. Sufficient power may be predicted based on schemes such as using a long short-term memory (LS™) recurrent neural network, in an example.

Figure 5:
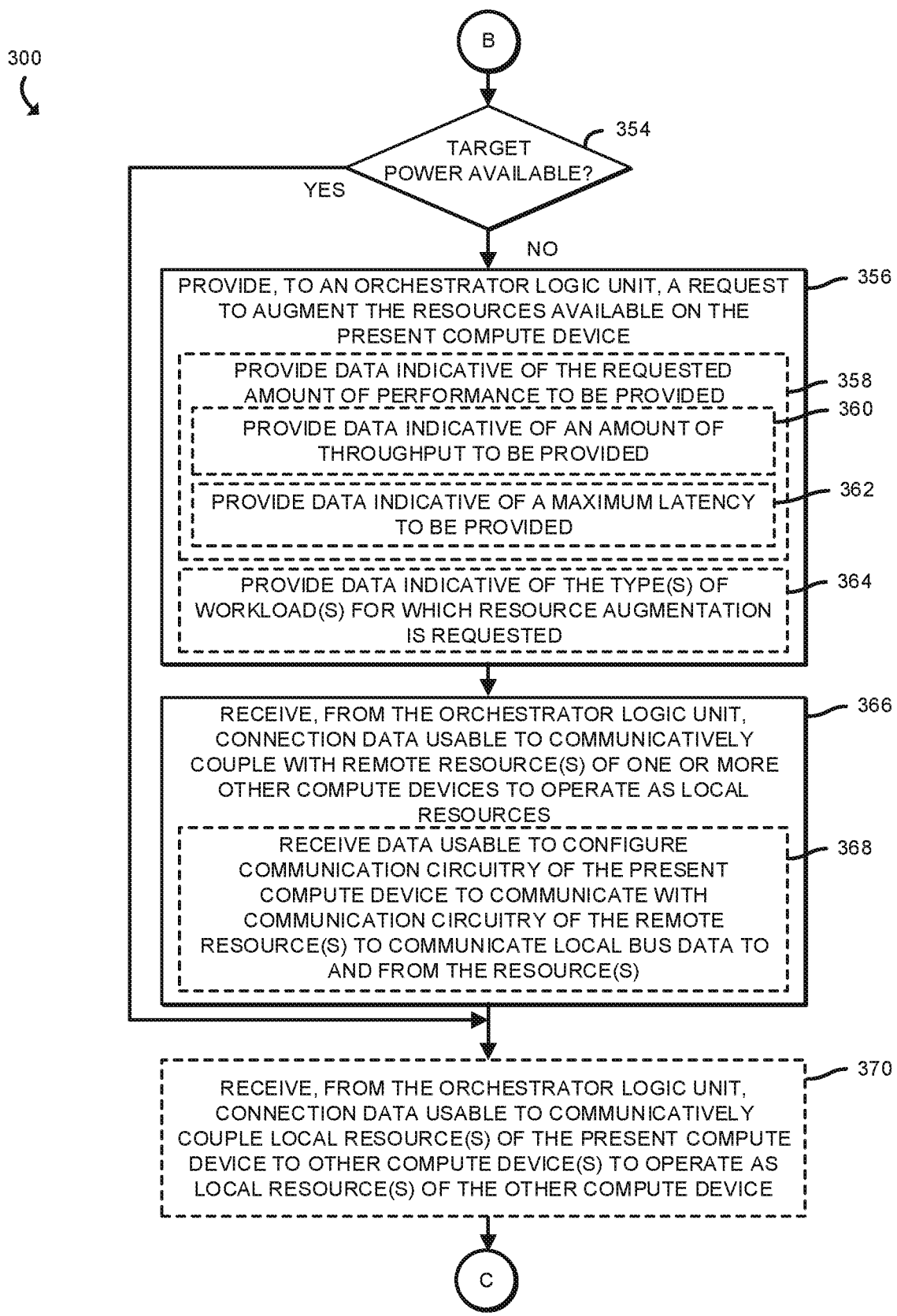

Referring now to FIG. 5, in response to a determination that sufficient power is not available, the method 300 advances to block 356 in which the client compute device 110 provides, to the orchestrator logic unit 170, a request to augment the resources available on the present compute device (e.g., the client compute device 110). In doing so, and as indicated in block 358, the client compute device 110 may provide, to the orchestrator logic unit 170, data indicative of the requested amount of performance to be provided through resource augmentation. For example, and as indicated in block 360, the client compute device 110 may provide data indicative of an amount of throughput to be provided. Additionally or alternatively, the client compute device 110 may provide data indicative of a latency (e.g., a maximum latency) to be achieved in the performance of one or more operations associated with a workload, as indicated in block 362. As indicated in block 364, the client compute device 110 may provide, to the orchestrator logic unit 170, data indicative of the type(s) of workload(s) for which resource augmentation is requested (e.g., compute intensive, artificial intelligence-related, graphics-related, data storage intensive, etc.).

Subsequently, in block 366, the client compute device 110 receives, from the orchestrator logic unit 170, connection data usable to communicatively couple with one or more remote resource(s) (e.g., one or more of the resources 150 and/or the resources 122) of one or more other compute devices (e.g., of the edge location 140 or the client compute device 112) to operate as local resources of the client compute device 110. In doing so, in the illustrative embodiment, and as indicated in block 368, the client compute device 110 receives data usable to configure communication circuitry (e.g., the communication circuitry 218) of the client compute device 110 to communicate with communication circuitry associated with the remote resources (e.g., the NIC(s) of the compute device(s) on which the remote resources are located), to communicate local bus data (e.g., PCIe data) to and from the resources. As such, the remote resources may execute workload operations for the client compute device 110 to satisfy a target performance of the workload(s) while consuming power from their respective power source(s), rather than consuming the limited power available to the client compute device 110. Subsequently or if sufficient power was determined to be available, the client compute device 110, in block 370, may receive, from the orchestrator logic unit 170, connection data usable to communicatively couple local resource(s) 120 of the present compute device (e.g., the client compute device 110) to other compute device(s) (e.g., to the client compute device 112) to operate as local resource(s) of the other compute device (e.g., through tunneling of local bus data).

Figure 6:
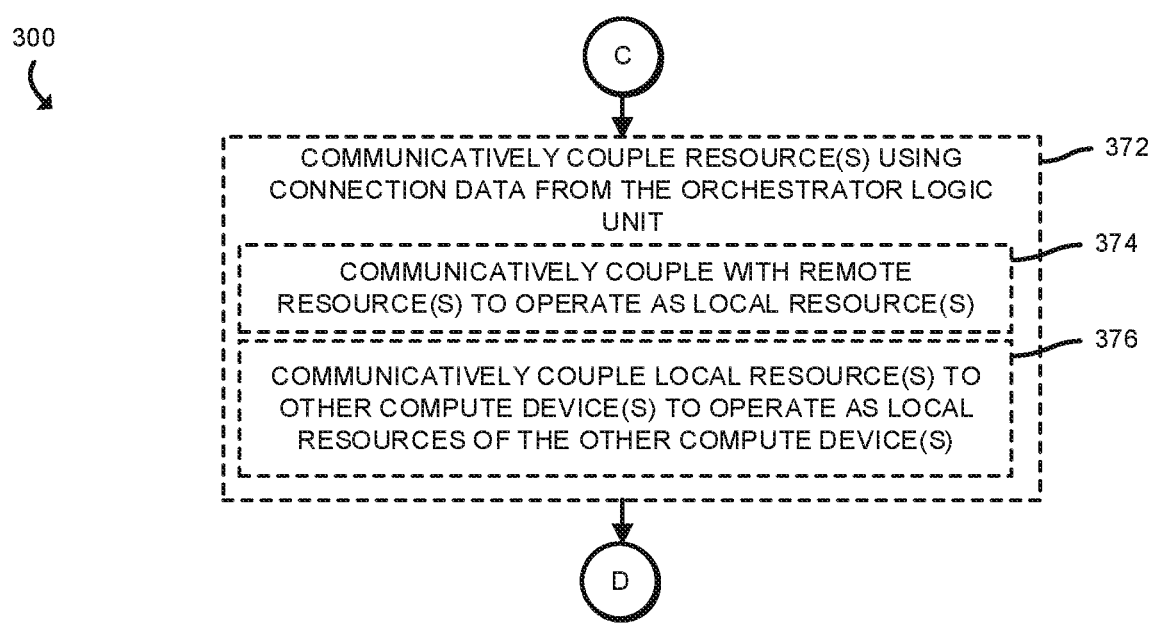

Referring now to FIG. 6, the client compute device 110 may (e.g., if connection data was received in blocks 366 and/or 370) communicatively couple resource(s) using the connection data from the orchestrator logic unit 170, as indicated in block 372. In doing so, and as indicated in block 374, the client compute device 110 may communicatively couple with remote resources (e.g., one or more of the resources 150 and/or 122) to operate as local resources of the client compute device 110. Additionally or alternatively, the client compute device 110 may communicatively couple local resources (e.g., one or more of the resources 120) to other compute device(s) (e.g., to the client compute device 112) to operate as local resources of the other compute device(s) (e.g., as being local to the client compute device 112). Subsequently, the method 300 loops back to block 304 to identify updates on the available resources of the client compute device 110 and potentially provide the updated information to the orchestrator logic unit 170, as well as continue execution of workload(s) (e.g., in block 336). Though shown in a particular sequence in FIGS. 3-6, it should be understood that the operation of the method 300 may be performed in a different order in other embodiments and/or concurrently (e.g., executing workload(s) while concurrently requesting resource augmentation from the orchestrator logic unit 170).

Figure 7:
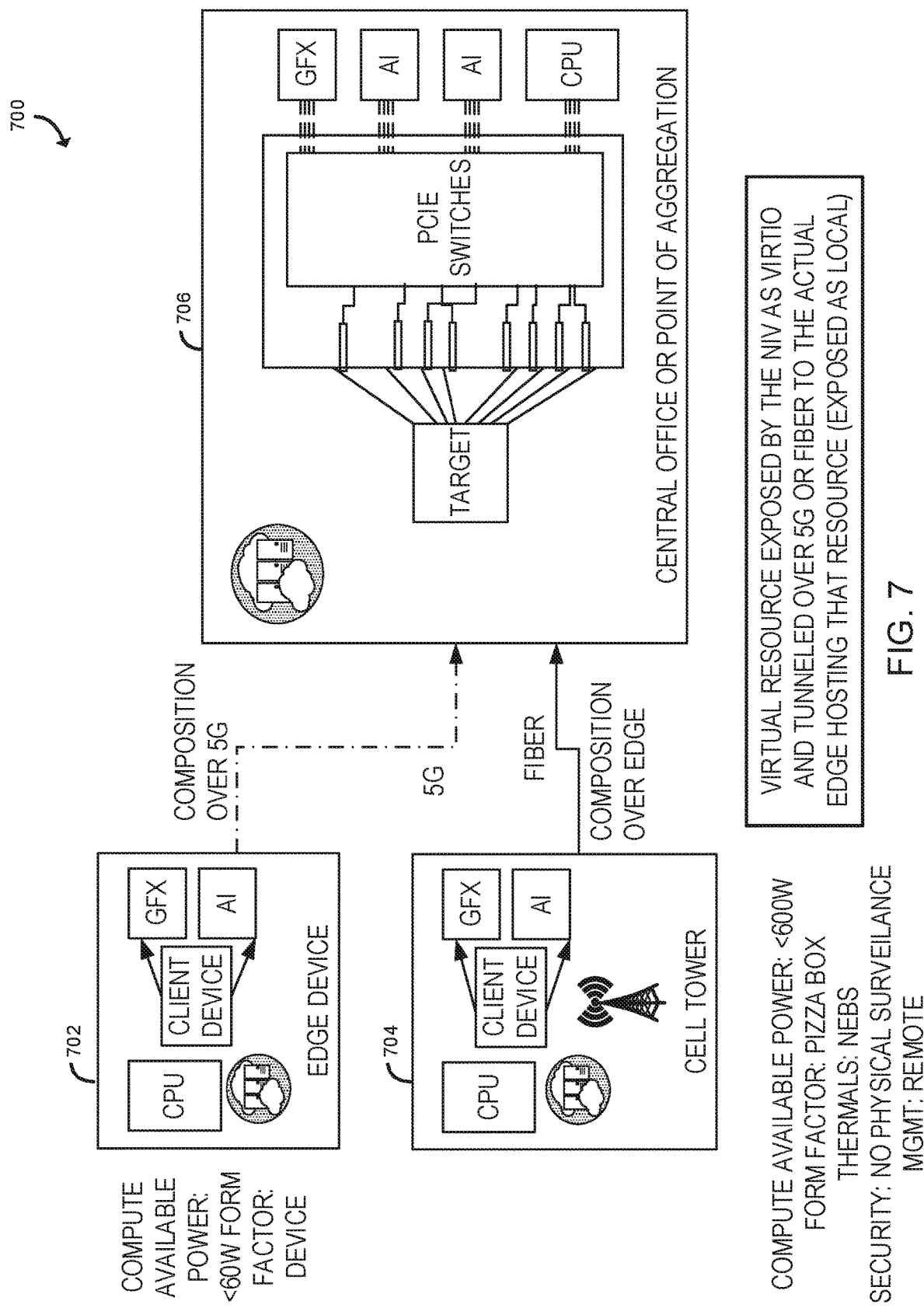
FIG. 7 is a simplified diagram of an embodiment of a system for dynamically augmenting the resources of a compute device in an edge environment.

Referring now to FIG. 7, in an example implementation 700 of the system 100, a client compute device 702 and another client compute device 704, similar to the client compute devices 110 and 112, are in communication with a central office 706, similar to the edge location 140 of FIG. 1. The client compute device 702, 704, which may be, for example, a vehicle, is in communication with the central office 706 through a 5G cellular connection. On the other hand, the client compute device 704 (e.g., a cell tower) is in communication with the central office 706 through a fiber (e.g. optical fiber) connection. In an example scenario, the client compute device 704 (e.g., the cell tower) may determine that the available power is less than three kilowatts and that an artificial intelligence related video service (e.g., similar to the application 116) needs to transition from 10 Inf/Watt to 20 Inf/Watt. In response, the artificial intelligence video service requests access to a pooled accelerator resource (e.g., an artificial intelligence accelerator or a graphics accelerator). In response, the system 100 connects the NIC of the client compute device 704 to an accelerator device located in the central office 706. The NIC of the client compute device 704 accesses the remote accelerator device as a local physical or virtual function to the processor of the client compute device 704. Further, the NIC tunnels PCIe data over the connection to the central office 706 and the Inf/Watt increases to 20. In other examples, a connection may be via a compute express link (CXL), e.g., for high-speed processor-to-device or processor-to-memory connections.

In an example, a resource of a remote device (e.g., a network device) may be used instead of a local device for executing a workload when power available to the local device is insufficient for executing the workload. In this ecosystem, a determination of where a service or workload should be run may be provided (e.g., by a local device, by an orchestrator, or the like). For example, the workload or service may be run on a cell tower, at a networked device, at a central office, or the like. There are multiple considerations that may be used to make the determination. For example, considerations may include proximity (e.g., for latency), available power, SLAs, QoS agreements, or the like. While decisions of where to run services generally depend on workload characteristics, system-level considerations may be used to streamline or improve function of the network. These system-level considerations may include availability or continuity of power.

Solar energy is used to power many devices, such as next generation base stations. Solar power introduces factors not necessarily seen in non-solar powered base stations, such as power availability, weather conditions, or workload prediction. Current cost and power models applied in other data centers such as the cloud do not consider dynamicity in the power. In the edge cloud ecosystem, computing resources may be available in multiple locations with different power criteria, for example.

Systems and methods for determining where to run a service based on workload-based conditions or system-level conditions are described herein. The systems and methods described herein use may run the service on a node of a distributed autonomously powered system or a cloud/remote server.

Systems and methods described herein identify power considerations that bear upon service execution in such distributed autonomously powered equipment. A determination of where to provide a service or execute a workload may be predicated on dynamic conditions (e.g., power availability at a base station or node of a network). The systems and techniques described herein include apparatus and methods that take dynamic power needs and costs into account when placing varying types of workloads.

An edge cabinet may be powered at least partially using solar power in accordance with some embodiments. A solar powered edge cabinet may be deployed in environments of end customers (e.g., an entity that own the premises), such as using a deployment model for edge computing in collaboration with hardware manufacturers. Hundreds of thousands of such cabinets may be deployed in many geographies. An example cell tower of the solar powered edge cabinet may be used on a neutral carrier or within a proprietary system.

Figure 8:
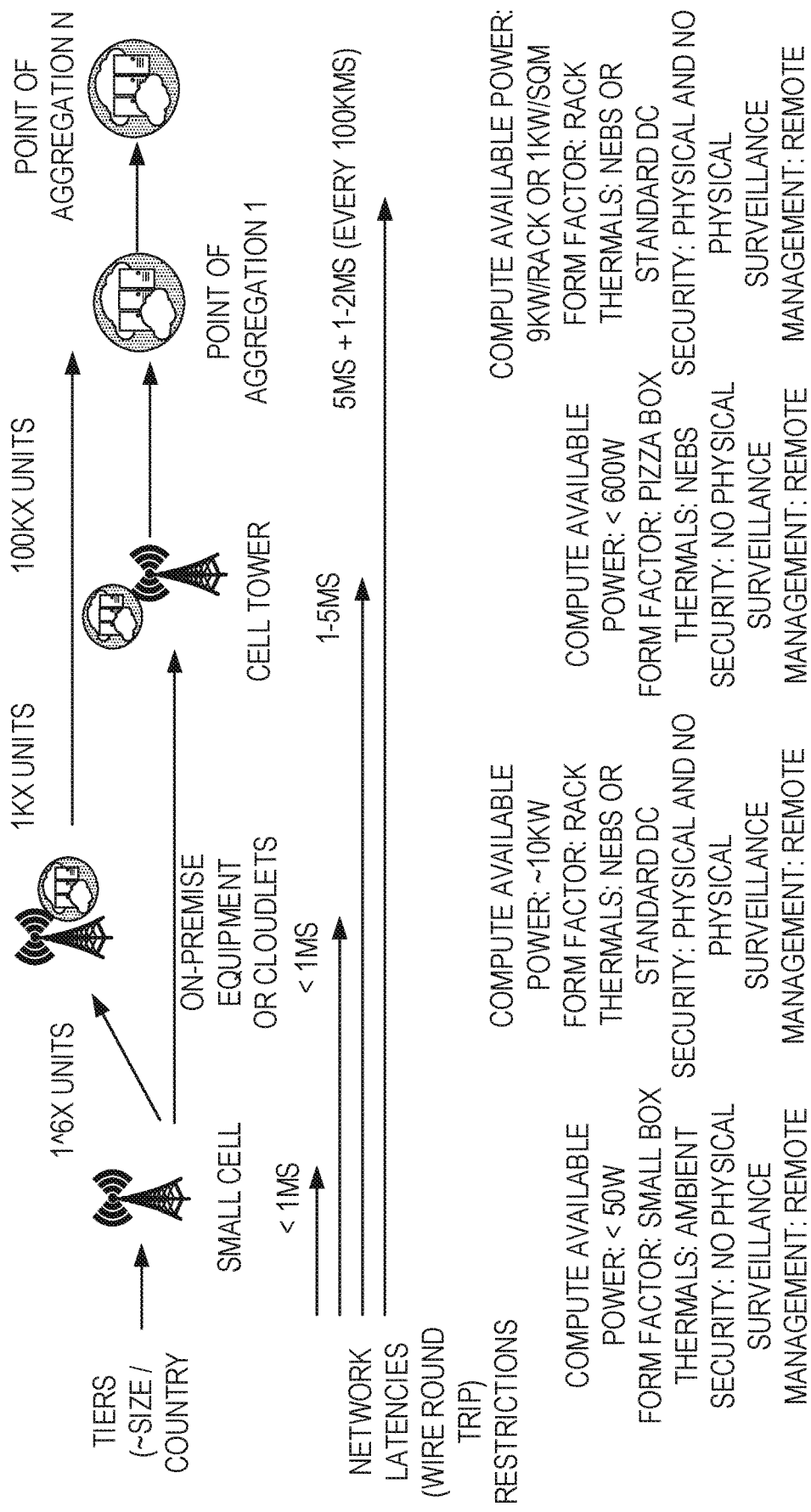
FIG. 8 illustrates example types of edge solar-power based deployment schemes and configurations in accordance with some embodiments.

FIG. 8 illustrates example types of edge solar-power based deployment schemes and configurations in accordance with some embodiments. For example, FIG. 8 includes a small cell example with, for example less than 50 Watts power. Another example is on-premise equipment or a cloudlet having around 10 kilowatts of power available. A third example is a cell tower, with around 600 or less Watts of power available. Other examples include an aggregation point with 9 kilowatts of available power per rack, for example or 1 kilowatt of power available per square meter. Each of these examples may have differing latency, for example less than a millisecond up to 5 milliseconds or more for longer distances. Distance to an originating device (e.g., a compute device requesting a resource for executing a service or workload) may affect latency. Balancing latency, power availability, and priority, for example, may be determined by an orchestrator.

Figure 9:
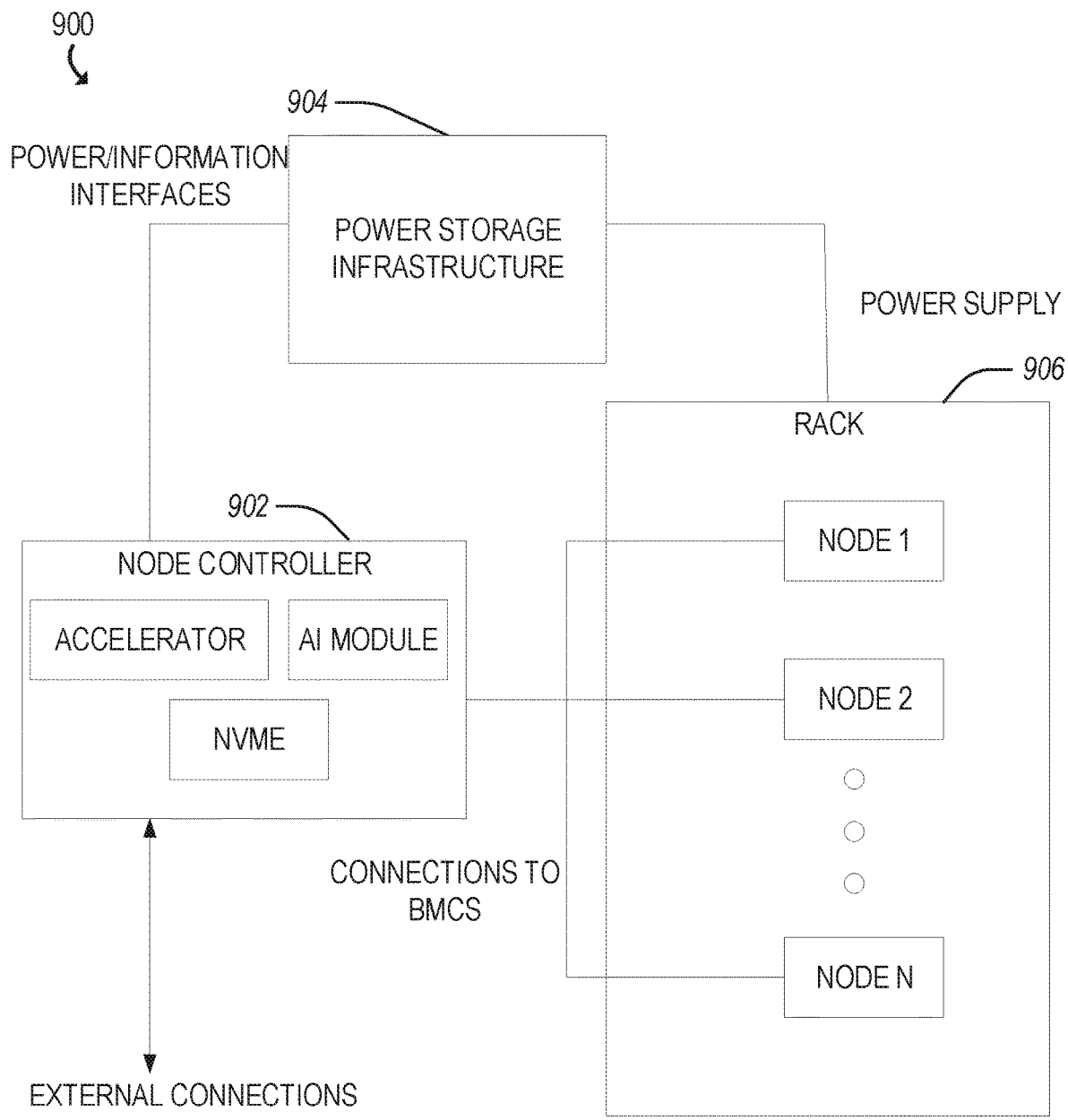
FIG. 9 illustrates example solar-powered edge computing architecture in accordance with some embodiments.

FIG. 9 illustrates example solar-powered edge computing architecture 900 in accordance with some embodiments. The architecture 900 shown in FIG. 9 provides hardware for managing techniques for accommodating and capitalizing upon solar-powered cell towers, while adapting execution of services to fit within varying levels of power availability and varying levels of demand. In the examples depicted in FIG. 9, the compute rack 906 (e.g., having a plurality of nodes) at the cell tower is equipped with a central node controller 902 that may have one or more of the following features. The node controller 902 may be connected to power storage infrastructure 904 (e.g., solar charging infrastructure) and can determine available power, charging rate, weather forecast, etc. The node controller 902 may be connected to baseboard management controllers (BMCs) of all the nodes and has a full view of power consumption of each node for a particular service. The node controller 902 may store (e.g., optionally in low power non-volatile memory (NVM) or NVM express (NVMe) historical information on services and their power-performance profiles. This information may be continuously refined. The node controller 902 may run AI algorithms to predict the service load anticipated at this edge location. The node controller 902 may use ambient and sensor data plus weather information (e.g., forecast) in order to better manage power based on the potential amount of coming energy from the solar panels during next N units of time (e.g., hours, days etc.).

Using the above features, the node controller 902 implements the logic of placement and execution of a service. That is, among other aspects, the node controller 902 considers the power-related aspects such as available power, predicted power availability and load predictions. In an example design, the assembly shown in FIG. 9 may be DC-powered, and thus avoid DC↔AC transformation losses altogether.

Using this infrastructure, the node controller 902 may also perform several optimizations and functionalities such execution of batch services or background services. Batch services may include publish/subscribe, or index-refresh which may be classified as deferrable can be performed according to power availability. For example, when sufficient charge is not available, these services may be paused or deferred. These services may make forward progress on an intermittent basis by allowing execution when sufficient charge is available.

The node controller 902 may perform execution of emergency services at low power. For example, a small amount of reserve charge may be maintained from solar charging for emergency purposes such as (i) completing a non-deferrable task at priority, (ii) transferring service out of a solar powered base station to an always actively powered base station. The node controller 902 may use policies (which may be set dynamically) to ensure that when the reserve power depletes, priority is first given to returning it to reserve power or slack power, so that the likelihood of failing below reserve power is minimized.

The node controller 902 may perform BMC control of compute nodes. Using telemetry and BMC sensors, nodes report the energy consumption by different services which are stored at the node controller. With this information, the node controller 902 stores historic usage information, which it can consult when scheduling workloads (as mentioned above), especially during the times of low power availability. This allows optimizations such as (i) turning off selected servers during low charge availability, (ii) deciding which services to be transferred out of the cell tower during low power availability, or (iii) regulating the power consumption of multiple critical services (using techniques like RAPL) so that the aggregate power demand is within the range of what is available dynamically.

The architecture 900 may be adapted easily to different type of edge infrastructures. The node controller 902 functions described above may decouple how and where orchestration is performed, from the decisions about where computation is performed (e.g., an orchestrator may run locally or remotely with respect to the cell tower or central office where computations are performed). The node controller 902 may act like a secondary orchestrator that helps the primary orchestrator, and may be independent of wherever the primary orchestrator runs, in scheduling critical services at cell towers while ensuring that their availability in spite of the use of solar energy. This achieves high flexibility even in geo-locations further away from electrical grids.

Cell towers or central offices may be setup such that a master orchestrator coordinates coarse-grained parameter sharing among many locally situated (and thus distributed) orchestrators at the various cell towers. This increases flexibility for communication service providers (CoSPs) in how they want to design their infrastructure and whether or from whom they want to lease spare capacity. The cell towers themselves may be on premises of or controlled by a different entity and cost the CoSPs very little fixed capital to setup, while the CoSPs can negotiate flexibly for how the owners of those premises are compensated. A significant density of computation may be aggregated even in rural regions where it would not be economical or feasible to set up edge data centers for low latency across a large but lightly populated area.

The architecture 900 may support each style (local, remote) as well as hybrid schemes, depending on the geographical distribution of resources within each CoSP. The architecture 900 may be used to implement specialized functions such as power and load determination as hardware functions through acceleration or NIC functionality. This aids fast determination and improves performance, while keeping the power requirements low.

The power storage infrastructure 904 may contain components to store and supply power to the computing resources. The power storage infrastructure 904 may include an interface to the node controller 902. Using this interface, the node controller 902 obtains such information as available power capacity, rate of charging and consumption, projected duration of availability (inclusive of capacitive and-or reserve capacity), etc.

Optionally the computation ingredients shown in the rack 906 may be DC-powered. When such is the case, (and if energy storage is also through DC interfaces) the DC→AC conversion and reconversion that is typical of other solar powered structures may be eliminated. This makes the architecture 900 significantly more efficient and lightweight. Any AC power needed for other purposes such as optional active cooling may be supplied through parallel or separate solar or other infrastructure.

In addition to interfacing with power storage infrastructure 904, the node controller 902 may interface with the BMCs of all the nodes (e.g., of rack 906). The node controller 902 may communicate over external wired or wireless network. While in general the node controller 902 may use standard UDP or TCP based links to the locally available computational infrastructure (e.g., as shown on FIG. 8), other configurations may be used, such as any appropriate fabric or wireless protocols. The communication between the node controller 902 and the computational infrastructure is neither bandwidth intensive nor latency sensitive. In particular, the node controller 902 may employ persistent connections, simple real-time OS, or protocol buffers based highly optimized communication-computation to drive down its own power consumption requirements and that of its peers.

The node controller 902 implements a sufficient platform (e.g., low power Atom) to run management services, obtain weather prediction from an external source, drive other specialized components in the platform (such as accelerators. AI logic), or the like. The services or ingredients in the node controller 902 may be used to perform control actions. Therefore the node controller 902 does not necessarily need significant power or energy. The primary consumer of power and energy in the architecture 900 may be the computational ingredients (e.g., within the rack 906).

As discussed above, the node controller 902 may be used to achieve dynamic power considerations, such as about current availability of power, or projected continued availability over a time span (which may run into tens of minutes in an example) in scheduling. The node controller 902 may have various policies or priorities that are configured, and may therefore operate autonomously. In addition, the policies or priorities may be customized dynamically by peer administrative control exercised through the external network.

The node controller 902 dynamically guides the execution of various services. As discussed above, some services may be deferrable, others may be transferable to a peer cell tower or pushed towards a deterministically powered infrastructure, and still others may be designed to be very low power and capable of running for very long durations even on reserve charge.

The node controller 902 may be used to configure different services to run at different power consumption profiles. For example, a yellow pages service may run at a low throughput during times when power availability is low (e.g., it is cloudy), and at other times the same service may be given a higher setting for throughput, according to circumstances. The node controller 902 may further schedule low throughput or latency insensitive work on low power nodes in the rack 906, while activating the higher power nodes only when there is a need to perform a given critical service at a very low latency.

The node controller 902 may maintain a power-performance-resources fingerprint for common services that are executed, for example in an NVM based data store. As part of the node controller's 902 orchestration responsibilities, service placement and power-performance profile decisions may be generated. The node controller 902 may make service migration decisions, and directs the remainder of the computational infrastructure to achieve the necessary migrations proactively or reactively, based on the inputs from the power storage infrastructure 904 or models of the node controller 902.

The node controller 902 may be equipped with low power NVM or NVMe devices to store its policies, priorities, workload profiles and histories, SLA data, or server/workload details obtained from telemetry and BMC sensors, with very low overhead and power expenditure. The node controller 902 uses these data for service placement or service migration decision making, instantaneous load prediction, and for updating trained models. Model training may be performed locally on the node controller 902 for incremental updates, or may also be refreshed from external, non-power constrained sources such as backend data centers or central offices (e.g., for larger updates or model replacement).

The node controller 902 may incorporate an accelerator. The accelerator is programmed to use the above inputs and deliver a decision for the services placement at very low power and latency. The node controller 902 may incorporate an AI module for training and inference. The node controller 902 may use the trained models for predicting computational and power demands from current and historic workload information.

Figure 10:
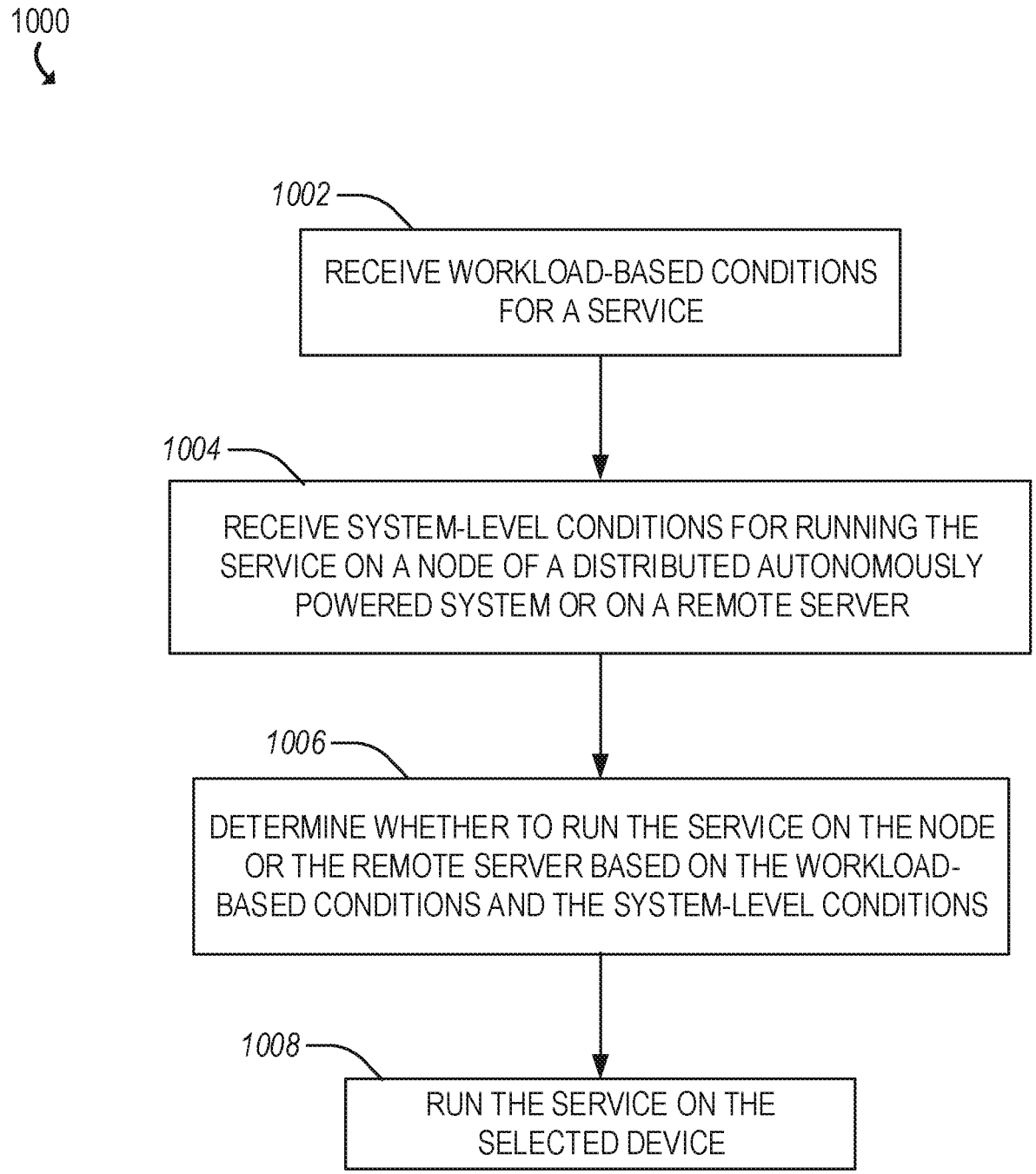
FIG. 10 illustrates a flowchart showing a technique for determining where to run a service based on workload-based conditions or system-level conditions in accordance with some embodiments.

FIG. 10 illustrates a flowchart showing a technique 1000 for determining where to run a service based on workload-based conditions or system-level conditions in accordance with some embodiments.

The technique 1000 includes an operation 1002 to receive workload-based conditions for a service. In an example, workload-based conditions may include latency requirements of the service, SLA, QoS agreements, time to complete the service, power requirements for the service, location requirements for the service, or the like.

The technique 1000 includes an operation 1004 to receive system-level conditions for running the service on a node of a distributed autonomously powered system or on a remote server. In an example, system-level conditions may include power availability, weather conditions, workload prediction, available compute power, network reliability, network connection, traffic (network or vehicle), or the like.

The technique 1000 includes an operation 1006 to determine whether to run the service on the node or the remote server based on the workload-based conditions and the system-level conditions. In an example, a determination may be made using only workload-based conditions, using only system-level conditions, or using both together. For example, when QoS required for the service is sufficiently high, system-level conditions may be ignored. In another example, when system-level conditions are critical (e.g., a battery is almost depleted), workload-based conditions may be ignored. In yet another example, both workload-based conditions and system-level conditions may be considered by balancing benefits and drawbacks of these conditions (e.g., using a weighted score, a threshold, or the like).

The technique 1000 includes an operation 1008 to run the service on the selected device (e.g., the node or the remote server, including for example a cloud server).

Figure 11:
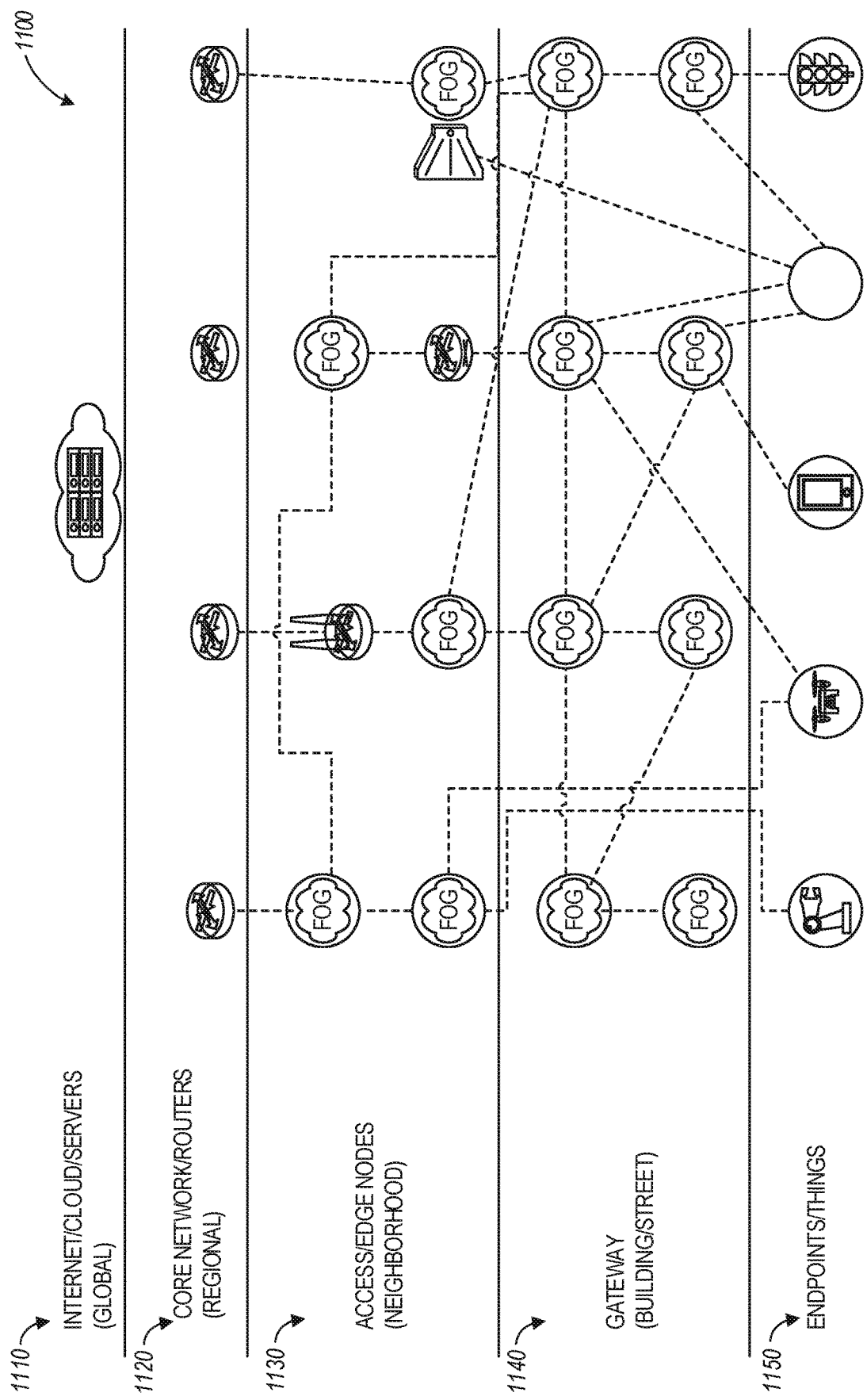
FIG. 11 illustrates a MEC and FOG network topology, in accordance with some embodiments.

FIG. 11 illustrates a MEC and FOG network topology 1100, according to an example. Referring to FIG. 11, the network topology 1100 can include a number of conventional networking layers, that can be extended through the use of a QoS manager discussed herein. Specifically, the relationships between endpoints (at endpoints/things network layer 1150), gateways (at gateway layer 1140), access or edge computing nodes (e.g., at neighborhood nodes layer 1130), core network or routers (e.g., at regional or central office layer 1120), may be represented through the use of data communicated via hosts that use QoS managers that can be located at various nodes within the topology 1100.

A FOG network (e.g., established at gateway layer 1140) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 11 illustrates a general architecture that integrates a number of MEC and FOG nodes-categorized in different layers (based on their position, connectivity and processing capabilities, etc.), with each node implementing a MEC V2X API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a host (e.g., a MEC host), or a simple entity hosting a MEC app and a light-weighted MEC platform.

In an example, a MEC or FOG node may be defined as an application instance, connected to or running on a device (host) that is hosting a MEC platform. Here, the application consumes MEC services and is associated with a MEC host in the system. The nodes may be migrated, associated with different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage but is not optimal for highly time-varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via NFVs and using resources managed by a QoS manager, based upon need. Depending on the real-time requirements in a vehicular communications context, a hierarchical structure of data processing and storage nodes can be defined. For example, including local ultra-low-latency processing, regional storage, and processing as well as remote cloud data-center based storage and processing. Key Performance Indicators (KPIs) may be used to identify where sensor data is best transferred and where it is processed or stored. This typically depends on the ISO layer dependency of the data. For example, the lower layer (PHY, MAC, routing, etc.) data typically changes quickly and is better handled locally in order to meet latency requirements. Higher layer data such as Application Layer data is typically less time critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in a MEC architecture.

Figure 12:
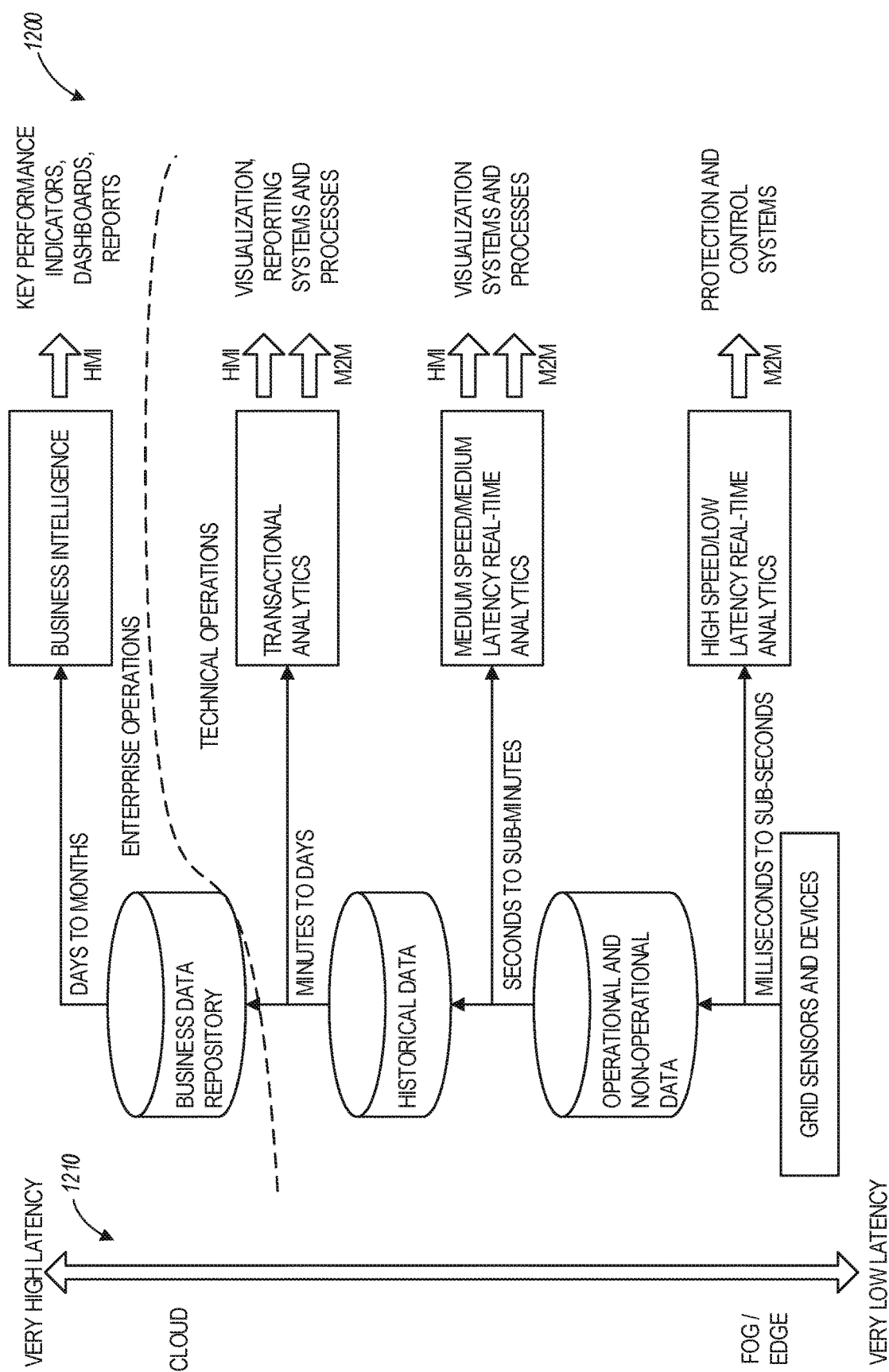
FIG. 12 illustrates the processing and storage layers in a MEC and FOG network, in accordance with some embodiments.

FIG. 12 illustrates the processing and storage layers in a MEC and FOG network 1200, according to an example. The illustrated data storage or processing hierarchy 1210 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of the hierarchy is storage shared across MEC components. For example, data is shared between distinct pools of vehicles that are in the range of each other.

The fifth level of the hierarchy is fixed infrastructure storage, such as in RSUs. This level may aggregate data from entities in hierarchy levels 1-4. The sixth level of the hierarchy is storage across the fixed infrastructure. This level may, for example, be located in the Core Network of a telecommunications network, or an enterprise cloud. Other types of layers and layer processing may follow from this example.

Even though techniques disclosed herein for network slicing, resource management, and blockchain traceability are discussed in connection with MEC-related architectures where at least one MEC entity is present, the disclosure is not limited in this regard and the disclosed techniques may be used in architectures that do not use MEC entities. For example, techniques associated with network slicing, resource management, and blockchain traceability can be performed in non-MEC architectures as well.

Even though techniques disclosed herein are described in connection with a MEC architecture and 5G architecture, the disclosure is not limited in this regard and the disclosed techniques can be used with other types of wireless architectures (e.g., 2G, 3G, 4G, etc.) that use one or more MEC entities.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA). High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra. LTE-Advanced Pro, LTE Licensed-Assisted Access (LAA), MuLTEfire. UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D. or Mobile telephony system D), Public Automated Land Mobile (Autotel/PALM), ARP (Finnish for Autoradiopuhelin, "car radio phone"), NMT (Nordic Mobile Telephony). High capacity version of NTT (Nippon Telegraph and Telephone) (Hicap). Cellular Digital Packet Data (CDPD), Mobitex, DataTAC. Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.1 lad, IEEE 802.11 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11 p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)). DSRC in Japan in the 700 MHz band (including 715 MHz to 725 MHz), etc.

Aspects described herein can be used in the context of any spectrum management scheme including a dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11 b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum. IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz), where particularly the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with the highest priority to tier-1 users, followed by tier-2, then tier-3 users, and so forth.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 13:
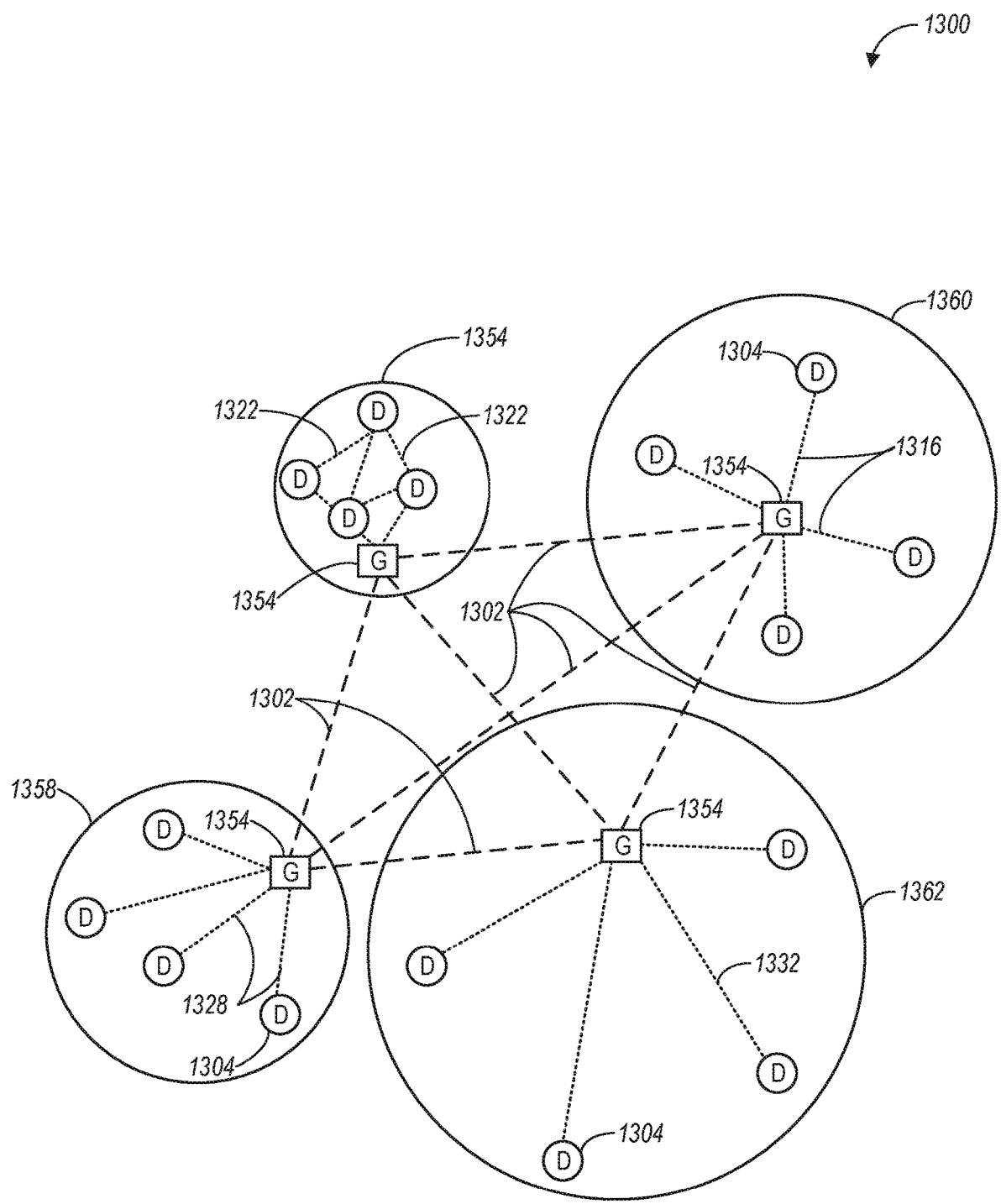
FIG. 13 illustrates a domain topology for respective Internet-of-Things (IoT) networks coupled through links to respective gateways, in accordance with some embodiments.

In further examples, the preceding examples of network communications and operations may be integrated with IoT and like device-based network architectures. FIG. 13 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an Edge/IoT processing device may include a semi-autonomous device performing a function, such as sensing or control, among others, in communication with other Edge/IoT processing devices and a wider network, such as the Internet.

MEC use cases have been envisioned to integrate into a number of network and application settings, including those to support network arrangements of IoT deployments. Edge/IoT processing devices are physical or virtualized objects that may communicate on a network (typically at the edge or endpoint of a network) and may include sensors, actuators, and other input/output components, such as to collect data or perform actions from a real-world environment. For example, Edge/IoT processing devices may include low-powered devices that are embedded or attached to everyday things, such as buildings, vehicles, packages, etc., to provide sensing, data, or processing functionality. Recently, Edge/IoT processing devices have become more popular and thus applications and use cases using these devices have proliferated.

Various standards have been proposed to more effectively interconnect and operate Edge/IoT processing devices and IoT network use cases, including those with MEC and mobile network architectures. Some of the relevant communication and network architecture standards include those distributed by groups such as ETSI, 3rd Generation Partnership Project (3GPP). Institute of Electrical and Electronics Engineers (IEEE), in addition to specialized IoT application interaction architecture and configuration standards distributed by working groups such as the Open Connectivity Foundation (OCF).

Often, Edge/IoT processing devices are limited in memory, size, or functionality, enabling larger numbers to be deployed for a similar cost to smaller numbers of larger devices. However, an Edge/IoT processing device may be a smartphone, laptop, tablet, PC, or other larger device. Further, an Edge/IoT processing device may be a virtual device, such as an application on a smartphone or another computing device. Edge/IoT processing devices may include IoT gateways, used to couple Edge/IoT processing devices to other Edge/IoT processing devices and to cloud applications, for data storage, process control, and the like.

Networks of Edge/IoT processing devices may include commercial and home automation devices, such as water distribution systems, electric power distribution systems, pipeline control systems, plant control systems, light switches, thermostats, locks, cameras, alarms, motion sensors, and the like. The Edge/IoT processing devices may be accessible through remote computers, servers, and other systems, for example, to control systems or access data.

The future growth of the Internet and like networks may involve very large numbers of Edge/IoT processing devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of Edge/IoT processing devices and networks present a number of new challenges in a heterogeneous network of connectivity comprising a combination of wired and wireless technologies.

FIG. 13 specifically provides a simplified drawing of a domain topology that may be used for a number of IoT networks comprising Edge/IoT processing devices 1304, with the IoT networks 1356, 1358, 1360, 1362, coupled through backbone links 1302 to respective gateways 1354. For example, a number of Edge/IoT processing devices 1304 may communicate with a gateway 1354, and with each other through the gateway 1354. To simplify the drawing, not every Edge/IoT processing device 1304, or communications link (e.g., link 1316, 1322, 1328, or 1332) is labeled. The backbone links 1302 may include any number of wired or wireless technologies, including optical networks, and may be part of a local area network (LAN), a wide area network (WAN), or the Internet. Additionally, such communication links facilitate optical signal paths among both Edge/IoT processing devices 1304 and gateways 1354, including the use of MUXing/deMUXing components that facilitate interconnection of the various devices.

The network topology may include any number of types of IoT networks, such as a mesh network provided with the network 1356 using Bluetooth low energy (BLE) links 1322. Other types of IoT networks that may be present include a wireless local area network (WLAN) network 1358 used to communicate with Edge/IoT processing devices 1304 through IEEE 802.11 (Wi-Fi®) links 1328, a cellular network 1360 used to communicate with Edge/IoT processing devices 1304 through an LTE/LTE-A (4G) or 5G cellular network, and a low-power wide area (LPWA) network 1362, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as Constrained Application Protocol (CoAP). The respective IoT networks may also be integrated with coordinator devices that provide a chain of links that form the cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between Edge/IoT processing devices 1304, such as over the backbone links 1302, may be protected by a decentralized system for authentication, authorization, and accounting (AAA). In a decentralized AAA system, distributed payment, credit, audit, authorization, and authentication systems may be implemented across the interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the Edge/IoT processing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1356, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 1358, for instance, may use systems that perform standards conversion to provide multi-standard connectivity, enabling Edge/IoT processing devices 1304 using different protocols to communicate. Further systems may provide seamless interconnectivity across a multi-standard infrastructure comprising visible Internet resources and hidden Internet resources.

Communications in the cellular network 1360, for instance, may be enhanced by systems that offload data, extend communications to more remote devices, or both. The LPWA network 1362 may include systems that perform non-Internet protocol (IP) to IP interconnections, addressing, and routing. Further, each of the Edge/IoT processing devices 1304 may include the appropriate transceiver for wide area communications with that device. Further, each Edge/IoT processing device 1304 may include other transceivers for communications using additional protocols and frequencies. This is discussed further with respect to the communication environment and hardware of an IoT processing device depicted in FIG. 15 and FIG. 16.

Finally, clusters of Edge/IoT processing devices may be equipped to communicate with other Edge/IoT processing devices as well as with a cloud network. This may enable the Edge/IoT processing devices to form an ad-hoc network between the devices, enabling them to function as a single device, which may be termed a fog device, fog platform, or fog network. This configuration is discussed further with respect to FIG. 14 below.

Figure 14:
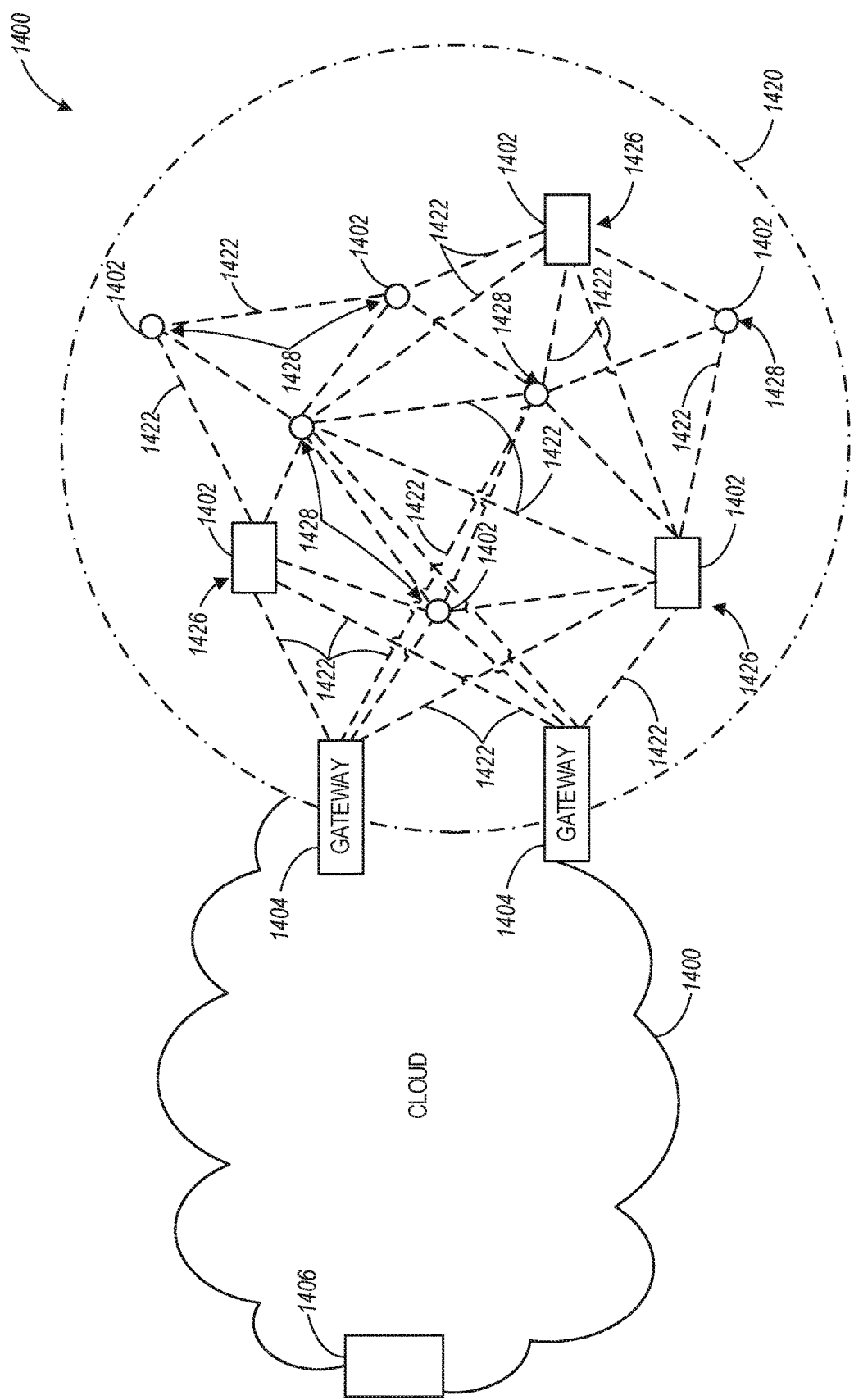
FIG. 14 illustrates a cloud-computing network in communication with a mesh network of Edge/IoT processing devices operating as fog devices at the edge of the cloud computing network, in accordance with some embodiments.

FIG. 14 illustrates a cloud-computing network in communication with a mesh network of Edge/IoT processing devices (devices 1402) operating as fog devices at the edge of the cloud computing network, according to an example. The mesh network of Edge/IoT processing devices may be termed a fog network 1420, established from a network of devices operating at the edge of the cloud 1400. To simplify the diagram, not every Edge/IoT processing device 1402 is labeled.

The fog network 1420 may be considered to be a massively interconnected network wherein a number of Edge/IoT processing devices 1402 are in communications with each other, for example, by radio links 1422. The fog network 1420 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1420 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of Edge/IoT processing devices 1402 are shown in this example, gateways 1404, data aggregators 1426, and sensors 1428, although any combinations of Edge/IoT processing devices 1402 and functionality may be used. The gateways 1404 may be edge devices that provide communications between the cloud 1400 and the fog 1420 and may also provide the backend process function for data obtained from sensors 1428, such as motion data, flow data, temperature data, and the like. The data aggregators 1426 may collect data from any number of the sensors 1428 and perform the back-end processing function for the analysis. The results, raw data, or both may be passed along to the cloud 1400 through the gateways 1404. The sensors 1428 may be full Edge/IoT processing devices 1402, for example, capable of both collecting data and processing the data. In some cases, the sensors 1428 may be more limited in functionality, for example, collecting the data and enabling the data aggregators 1426 or gateways 1404 to process the data.

Communications from any of the Edge/IoT processing devices 1402 may be passed along a convenient path (e.g., a most convenient path) between any of the Edge/IoT processing devices 1402 to reach the gateways 1404. In these networks, the number of interconnections provides substantial redundancy, enabling communications to be maintained, even with the loss of a number of Edge/IoT processing devices 1402. Further, the use of a mesh network may enable Edge/IoT processing devices 1402 that are very low power or located at a distance from infrastructure to be used, as the range to connect to another Edge/IoT processing devices 1402 may be much less than the range to connect to the gateways 1404.

The fog 1420 provided from these Edge/IoT processing devices 1402 may be presented to devices in the cloud 1400, such as a server 1406, as a single device located at the edge of the cloud 1400, e.g., a fog device. In this example, the alerts coming from the Fog device may be sent without being identified as coming from a specific Edge/IoT processing devices 1402 within the fog 1420. In this fashion, the fog 1420 may be considered a distributed platform that provides computing and storage resources to perform processing or data-intensive tasks such as data analytics, data aggregation, and machine learning, among others.

In some examples, the Edge/IoT processing devices 1402 may be configured using an imperative programming style, e.g., with each Edge/IoT processing devices 1402 having a specific function and communication partners. However, the Edge/IoT processing devices 1402 forming the fog device may be configured in a declarative programming style, enabling the Edge/IoT processing devices 1402 to reconfigure their operations and communications, such as to determine needed resources in response to conditions, queries, and device failures. As an example, a query from a user located at a server 1406 about the operations of a subset of equipment monitored by the Edge/IoT processing devices 1402 may result in the fog 1420 device selecting the Edge/IoT processing devices 1402, such as particular sensors 1428, needed to answer the query. The data from these sensors 1428 may then be aggregated and analyzed by any combination of the sensors 1428, data aggregators 1426, or gateways 1404, before being sent on by the fog 1420 device to the server 1406 to answer the query. In this example, Edge/IoT processing devices 1402 in the fog 1420 may select the sensors 1428 used based on the query, such as adding data from flow sensors or temperature sensors. Further, if some of the Edge/IoT processing devices 1402 are not operational, other Edge/IoT processing devices 1402 in the fog 1420 device may provide analogous data, if available.

In other examples, the operations and functionality described above may be embodied by an Edge/IoT processing device machine in the example form of an electronic processing system, within which a set or sequence of instructions may be executed to cause the electronic processing system to perform any one of the methodologies discussed herein, according to an example embodiment. The machine may be an Edge/IoT processing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device. IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 15:
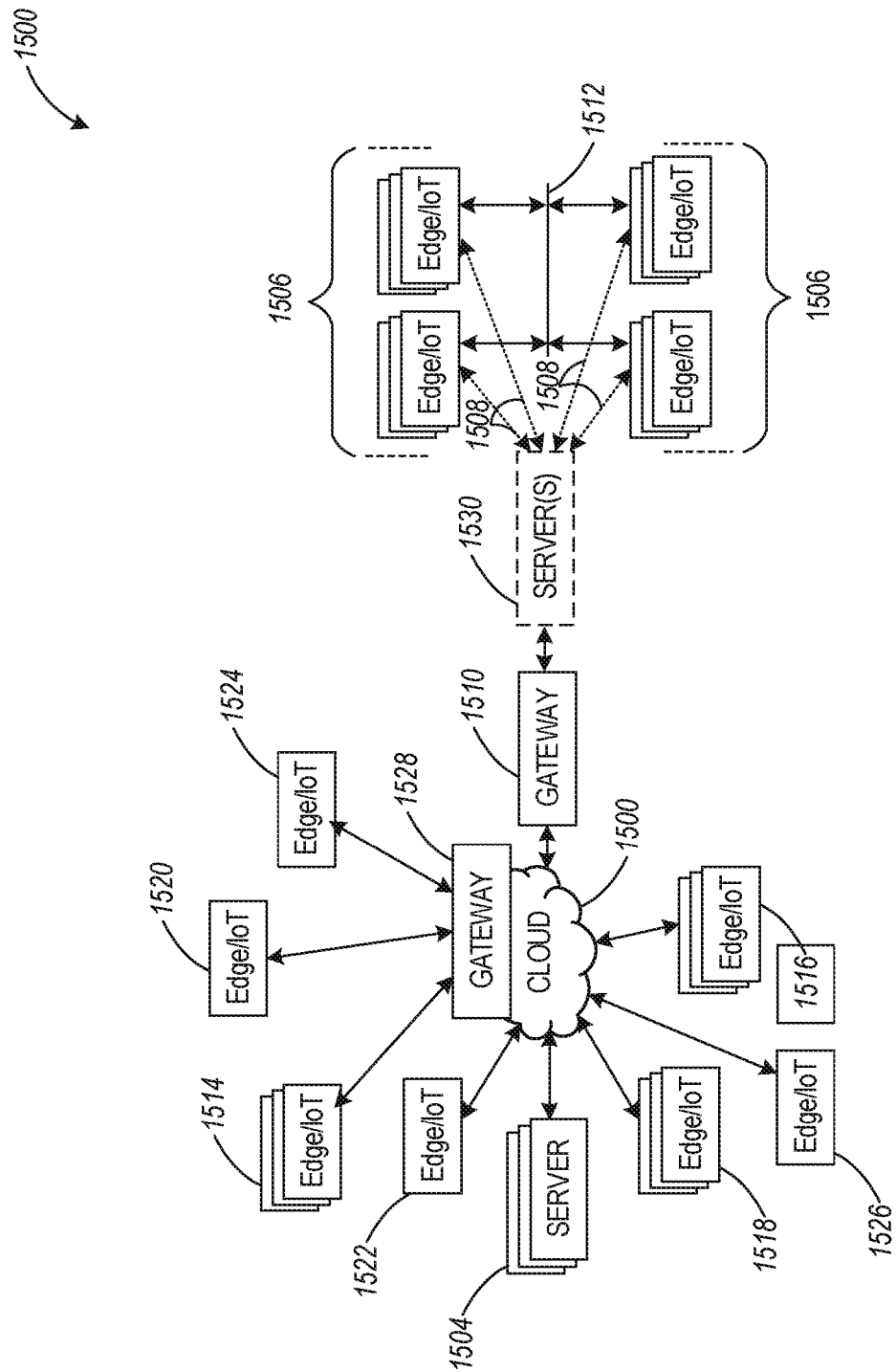
FIG. 15 illustrates a block diagram of a cloud computing network in communication with a number of Edge/IoT processing devices, in accordance with some embodiments.

FIG. 15 illustrates a block diagram of a cloud computing network, or cloud 1500, in communication with a number of Edge/IoT processing devices, according to an example. The cloud computing network (or "cloud") 1500 may represent the Internet or may be a local area network (LAN), or a wide area network (WAN), such as a proprietary network for a company. The Edge/IoT processing devices may include any number of different types of devices, grouped in various combinations. For example, a traffic control group 1506 may include Edge/IoT processing devices along streets in a city. These Edge/IoT processing devices may include stoplights, traffic flow monitors, cameras, weather sensors, and the like. The traffic control group 1506, or other subgroups, may be in communication with the cloud 1500 through wired or wireless links 1508, such as LPWA links, optical links, and the like. Further, a wired or wireless sub-network 1512 may allow the Edge/IoT processing devices to communicate with each other, such as through a local area network, a wireless local area network, and the like. The Edge/IoT processing devices may use another device, such as a gateway 1510 or 1528 to communicate with remote locations such as the cloud 1500; the Edge/IoT processing devices may also use one or more servers 1530 to facilitate communication with the cloud 1500 or with the gateway 1510. For example, the one or more servers 1530 may operate as an intermediate network node to support a local edge cloud or fog implementation among a local area network. Further, the gateway 1528 that is depicted may operate in a cloud-to-gateway-to-many edge devices configuration, such as with the various Edge/IoT processing devices 1514, 1520, 1524 being constrained or dynamic to an assignment and use of resources in the cloud 1500.

Other example groups of Edge/IoT processing devices may include remote weather stations 1514, local information terminals 1516, alarm systems 1518, automated teller machines 1520, alarm panels 1522, or moving vehicles, such as emergency vehicles 1524 or other vehicles 1526, among many others. Each of these Edge/IoT processing devices may be in communication with other Edge/IoT processing devices, with servers 1504, with another IoT fog platform or system, or a combination therein. The groups of Edge/IoT processing devices may be deployed in various residential, commercial, and industrial settings (including in both private or public environments).

As may be seen from FIG. 15, a large number of Edge/IoT processing devices may be communicating through the cloud 1500. This may allow different Edge/IoT processing devices to request or provide information to other devices autonomously. For example, a group of Edge/IoT processing devices (e.g., the traffic control group 1506) may request a current weather forecast from a group of remote weather stations 1514, which may provide the forecast without human intervention. Further, an emergency vehicle 1524 may be alerted by an automated teller machine 1520 that a burglary is in progress. As the emergency vehicle 1524 proceeds towards the automated teller machine 1520, it may access the traffic control group 1506 to request clearance to the location, for example, by lights turning red to block cross traffic at an intersection insufficient time for the emergency vehicle 1524 to have unimpeded access to the intersection.

Clusters of Edge/IoT processing devices, such as the remote weather stations 1514 or the traffic control group 1506, may be equipped to communicate with other Edge/IoT processing devices as well as with the cloud 1500. This may allow the Edge/IoT processing devices to form an ad-hoc network between the devices, allowing them to function as a single device, which may be termed a fog platform or system (e.g., as described above with reference to FIG. 14).

Figure 16:
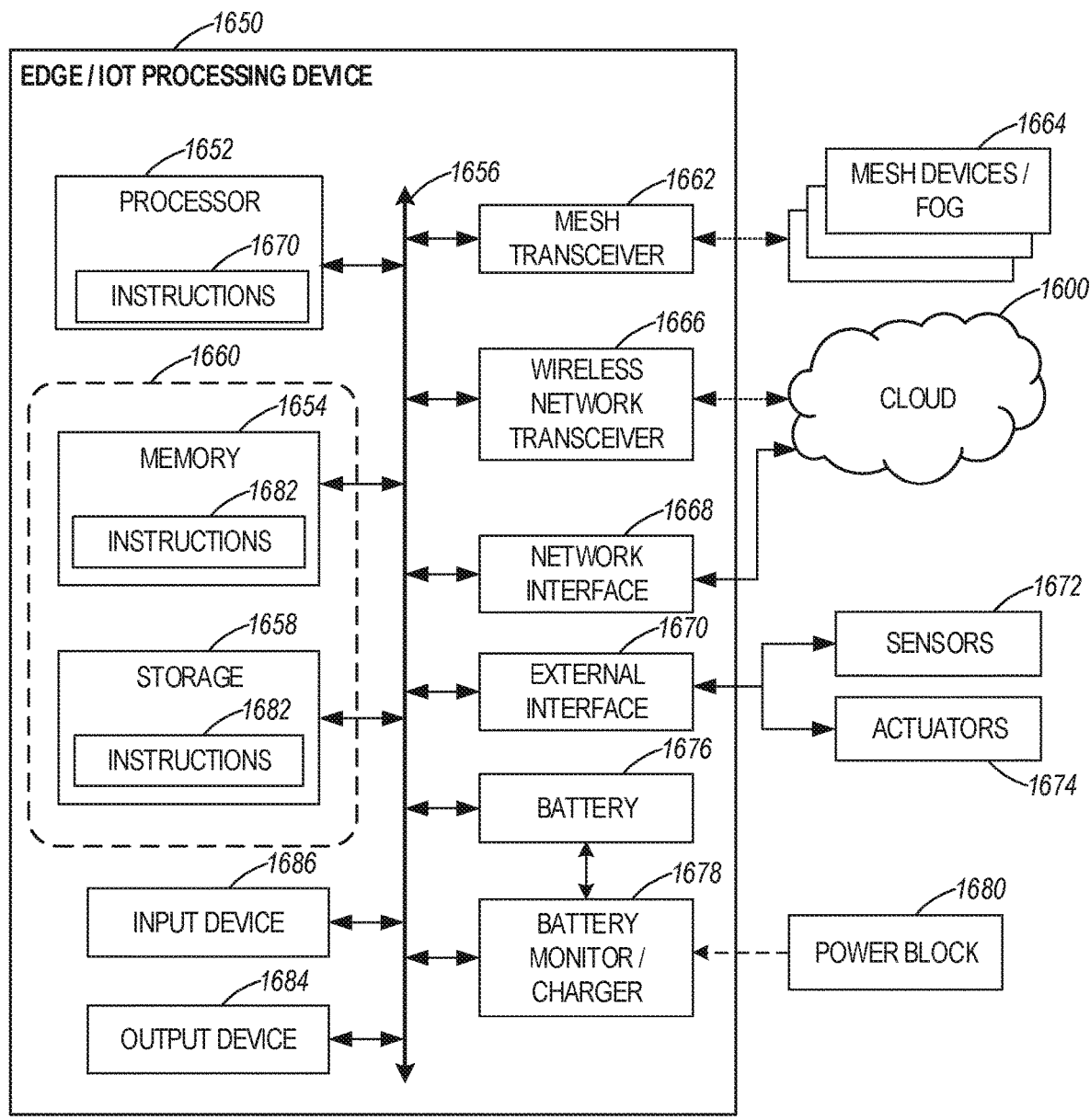
FIG. 16 is a block diagram of an example of components that may be present in an Edge/IoT processing device for implementing the techniques (e.g., operations, processes, methods, and methodologies) described herein, in accordance with some embodiments.

FIG. 16 is a block diagram of an example of components that may be present in an Edge/IoT processing device 1650 for implementing the techniques (e.g., operations, processes, methods, and methodologies) described herein. The Edge/IoT processing device 1650 may include any combinations of the components shown in the example or referenced in the disclosure above, and it may include any device usable with an Edge/Fog/IoT communication network or a combination of such networks. The components may be implemented as ICs, portions thereof, discrete electronic devices, or other modules, logic, hardware, software, firmware, or a combination thereof adapted in the Edge/IoT processing device 1650, or as components otherwise incorporated within a chassis of a larger system. Additionally, the block diagram of FIG. 16 is intended to depict a high-level view of components of the Edge/IoT processing device 1650. However, some of the components shown may be omitted, additional components may be present, and a different arrangement of the components shown may occur in other implementations.

The Edge/IoT processing device 1650 may include processing circuitry in the form of a processor 1652, which may be a microprocessor, a multi-core processor, a multithreaded processor, an ultra-low voltage processor, an embedded processor, or other known processing elements. The processor 1652 may be a part of a system on a chip (SoC) in which the processor 1652 and other components are formed into a single integrated circuit, or a single package, such as the Edison™ or Galileo™ SoC boards from Intel. As an example, the processor 1652 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices. Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1652 may communicate with a system memory 1654 over an interconnect 1656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1658 may also couple to the processor 1652 via the interconnect 1656. In an example, the storage 1658 may be implemented via a solid-state disk drive (SSDD). Other devices that may be used for the storage 1658 include flash memory cards, such as SD cards, microSD cards, XD picture cards, and the like, and USB flash drives. In low power implementations, the storage 1658 may be on-die memory or registers associated with the processor 1652. However, in some examples, the storage 1658 may be implemented using a micro hard disk drive (HDD). Further, any number of new technologies may be used for the storage 1658 in addition to, or instead of, the technologies described, such resistance change memories, phase change memories, holographic memories, or chemical memories, among others.

The components may communicate over the interconnect 1656. The interconnect 1656 may include any number of technologies, including industry standard architecture (ISA), extended ISA (EISA), peripheral component interconnect (PCI), peripheral component interconnect extended (PCIx). PCI express (PCIe), or any number of other technologies. The interconnect 1656 may be a proprietary bus, for example, used in a SoC based system. Other bus systems may be included, such as an 12C interface, an SPI interface, point to point interfaces, and a power bus, among others.

The interconnect 1656 may couple the processor 1652 to a mesh transceiver 1662, for communications with other mesh devices 1664. The mesh transceiver 1662 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1664. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1662 may communicate using multiple standards or radios for communications at a different range. For example, the Edge/IoT processing device 1650 may communicate with close devices, e.g., within about 10 meters, using a local transceiver based on BLE, or another low power radio, to save power. More distant mesh devices 1664, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1666 may be included to communicate with devices or services in the cloud 1600 via local or wide area network protocols. The wireless network transceiver 1666 may be an LPWA transceiver that follows the IEEE 802.15.4, or IEEE 802.15.4g standards, among others. The Edge/IoT processing device 1650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox. and other technologies. Further, other communications techniques, such as time-slotted channel hopping, described in the IEEE 802.15.4e specification may be used.

Any number of other radio communications and protocols may be used in addition to the systems mentioned for the mesh transceiver 1662 and wireless network transceiver 1666, as described herein. For example, the radio transceivers 1662 and 1666 may include an LTE or another cellular transceiver that uses spread spectrum (SPA/SAS) communications for implementing high-speed communications. Further, any number of other protocols may be used, such as Wi-Fi® networks for medium speed communications and provision of network communications.

The radio transceivers 1662 and 1666 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1666, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1668 may be included to provide a wired communication to the cloud 1600 or to other devices, such as the mesh devices 1664. The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1668 may be included to enable connecting to a second network, for example, a NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of components 1662, 1666, 1668, or 1670. Accordingly, in various examples, applicable means for communicating (e.g., receiving, transmitting, etc.) may be embodied by such communications circuitry.

The interconnect 1656 may couple the processor 1652 to an external interface 1670 that is used to connect external devices or subsystems. The external devices may include sensors 1672, such as accelerometers, level sensors, flow sensors, optical light sensors, camera sensors, temperature sensors, a global positioning system (GPS) sensors, pressure sensors, barometric pressure sensors, and the like. The external interface 1670 further may be used to connect the Edge/IoT processing device 1650 to actuators 1674, such as power switches, valve actuators, an audible sound generator, a visual warning device, and the like.

In some optional examples, various input/output (I/O) devices may be present within or connected to, the Edge/IoT processing device 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the Edge/IoT processing device 1650.

A battery 1676 may power the Edge/IoT processing device 1650, although, in examples in which the Edge/IoT processing device 1650 is mounted in a fixed location, it may have a power supply coupled to an electrical grid. The battery 1676 may be a lithium ion battery, or a metal-air battery, such as a zinc-air battery, an aluminum-air battery, a lithium-air battery, and the like.

A battery monitor/charger 1678 may be included in the Edge/IoT processing device 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1678 may communicate the information on the battery 1676 to the processor 1652 over the interconnect 1656. The battery monitor/charger 1678 may also include an analog-to-digital (ADC) converter that enables the processor 1652 to directly monitor the voltage of the battery 1676 or the current flow from the battery 1676. The battery parameters may be used to determine actions that the Edge/IoT processing device 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the Edge/IoT processing device 1650. A wireless battery charging circuit, such as an LTC4020 chip from Linear Technologies of Milpitas. Calif., among others, may be included in the battery monitor/charger 1678. The specific charging circuits may be selected based on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application specific integrated circuit (ASIC).

In an example, the instructions 1682 provided via the memory 1654, the storage 1658, or the processor 1652 may be embodied as a non-transitory, machine-readable medium 1660 including code to direct the processor 1652 to perform electronic operations in the Edge/IoT processing device 1650. The processor 1652 may access the non-transitory, machine-readable medium 1660 over the interconnect 1656. For instance, the non-transitory, machine-readable medium 1660 may be embodied by devices described for the storage 1658 or may include specific storage units such as optical disks, flash drives, or any number of other hardware devices. The non-transitory, machine-readable medium 1660 may include instructions to direct the processor 1652 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

In some aspects, 5G adoption depends on the ability to provide communication service providers (CoSPs) the ability to provision, manage, adjust, and operate multiple virtual networks over a common set of physical (wireless and wired) network infrastructure. End-to-end "slices" carve out virtual logical networks using physical computing and network resources. Each slice can be specifically configured to support performance related to the service supported including capacity, security levels, geographical coverage, and latency. Slices included partitioning the wireless radio of Radio Access Network (RAN), core infrastructure including the Evolved Packet Core (EPC), as well as the switches and Data Center Servers where the 5G mobile applications and content may be hosted. Furthermore, 5G EDGE devices may also be included in the slice depending on the service latency requirements.

In some aspects, 5G network slices may support a wide range of applications from (semi-)autonomous vehicles, remote health monitoring and first-responder applications requiring the best security/traceability to tiered smartphone plans and IoT devices that may be ok without extra resource traceability.

Figure 17:
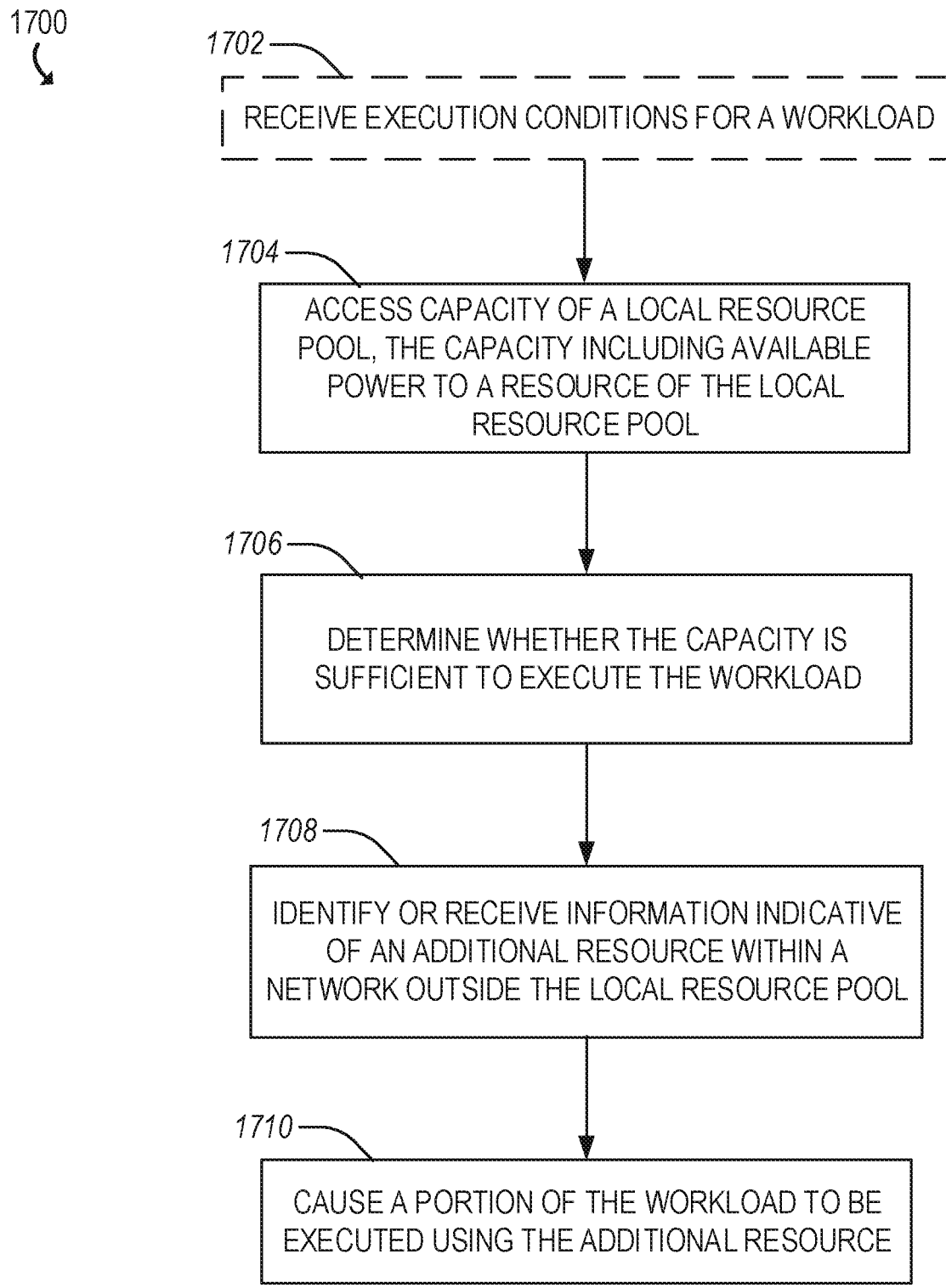
FIG. 17 illustrates a flowchart showing a technique for configuring a compute device operable in an edge network, the compute device including a local resource pool to execute a workload in the edge network in accordance with some embodiments.

FIG. 17 illustrates a flowchart showing a technique 1700 for configuring a compute device operable in an edge network, the compute device including a local resource pool to execute a workload in the edge network in accordance with some embodiments. The compute device may be a node of a distributed autonomously powered system.

The technique 1700 includes an optional operation 1702 to receive execution conditions for a workload or system-level conditions for a local resource pool (e.g., a group or set of resources available, activatable, or connected to the compute device). The system-level conditions may include power available to the one or more resources. In an example, the workload-based conditions include at least one of latency requirements of the workload, an SLA related to the workload, a QoS agreement related to the workload, a time to complete the workload, power requirements for the workload, location requirements for the workload, or the like. The execution conditions may be received or identified from a local data store.

The technique 1700 includes an operation 1704 to access capacity of a local resource pool, the capacity including available power to a resource of the local resource pool. The technique 1700 includes an operation 1706 to determine whether the capacity is sufficient to execute the workload, for example based on the execution conditions for the workload or the power available to the local resource pool.

The technique 1700 includes an operation 1708 to identify or receive information indicative of an additional resource within a network outside the local resource pool (e.g., outside the compute device). In an example, the compute device may identify an additional resource of the network. In another example, in response to a determination that the power available to the local resource pool is insufficient to execute the workload (e.g., based on a threshold), the compute device may provide a request to augment the local resource pool of the compute device. The request may be provided to an orchestrator logic unit, for example (e.g., on device of the network). The request may include the system-level conditions for the local resource pool. The orchestrator logic unit may send information indicative of the additional resource within the network outside the compute device.

The technique 1700 includes an operation 1710 to cause a portion of the workload to be executed using at least the additional resource. In an example, operation 1710 includes causing the workload to be executed entirely using the additional resource without using the local resource pool. In another example, the workload is executed with the additional resource and at least one resource of the local resource pool of the compute device. In another example, the remaining portion of the workload is executed using the local resource pool (e.g., a resource within the pool). In an example, the additional resource is on a remote server.

The technique 1700 may further include an operation to receive, for example from an orchestrator logic unit, connection data usable to communicatively couple with the additional resource of another compute device to operate as a local resource of the compute device. The compute device may be communicatively coupled with the additional resource to operate as a local resource using the connection data. In this example, operation 1710 may include executing the workload with the local resource pool and the communicatively coupled additional resource. Communicatively coupling the compute device with the additional resource may include communicatively coupling the compute device with at least one of a compute resource, an accelerator resource, or a data storage resource.

Example 1 is a compute device operable in an edge network, the compute device including a local resource pool to execute a workload in the edge network, the compute device comprising: processing circuitry to: receive execution conditions for the workload; access capacity of the local resource pool, the capacity including available power to the local resource pool; determine whether the capacity is sufficient to execute the workload based on the execution conditions for the workload; provide, to an orchestrator logic unit in response to a determination that the capacity is insufficient to execute the workload, a request to augment the local resource pool with resources of a remote resource pool; receive, from the orchestrator logic unit, information indicative of an additional resource of the remote resource pool within the network outside the compute device; and cause a portion of the workload to be executed using the additional resource.

In Example 2, the subject matter of Example 1 includes, wherein the workload is executed entirely using the additional resource without using the local resource pool.

In Example 3, the subject matter of Examples 1-2 includes, wherein the compute device is a node of a distributed autonomously powered system and the additional resource is on a remote server.

In Example 4, the subject matter of Examples 1-3 includes, wherein the processing circuitry is further configured to: receive, from the orchestrator logic unit, connection data usable to communicatively couple with the additional resource to operate within the local resource pool of the compute device; and communicatively couple, using the connection data, the compute device with the additional resource; wherein to cause the portion of the workload to be executed, the processing circuitry is configured to execute the workload using the local resource pool including the additional resource.

In Example 5, the subject matter of Example 4 includes, wherein to communicatively couple the compute device with the additional resource, the processing circuitry is further configured to communicatively couple the compute device with at least one of a compute resource, an accelerator resource, or a data storage resource.

In Example 6, the subject matter of Examples 1-5 includes, wherein the processing circuitry is further configured to provide, to the orchestrator logic, system-level conditions for the local resource pool.

In Example 7, the subject matter of Examples 1-6 includes, wherein the workload-based conditions include at least one of latency requirements of the workload, a service level agreement related to the workload, a quality of service (QoS) agreement related to the workload, a time to complete the workload, power requirements for the workload, or location requirements for the workload.

In Example 8, the subject matter of Examples 1-7 includes, wherein the processing circuitry is further configured to execute a remaining portion of the workload using the local resource pool.

Example 9 is a method of configuring a compute device including a local resource pool to execute a workload in an edge network, the method comprising: receiving execution conditions for the workload; accessing capacity of the local resource pool, the capacity including available power to the local resource pool; determining, using a processor, whether the capacity is sufficient to execute the workload based on the execution conditions for the workload; providing, to an orchestrator logic unit in response to a determination that the capacity is insufficient to execute the workload, a request to augment the local resource pool with resources of a remote resource pool; receiving, from the orchestrator logic unit, information indicative of an additional resource of the remote resource pool within the network outside the compute device; and causing a portion of the workload to be executed using the additional resource.

In Example 10, the subject matter of Example 9 includes, wherein the workload is executed entirely using the additional resource without using the local resource pool.

In Example 11, the subject matter of Examples 9-10 includes, wherein the compute device is a node of a distributed autonomously powered system and the additional resource is on a remote server.

In Example 12, the subject matter of Examples 9-11 includes, receiving, from the orchestrator logic unit, connection data usable to communicatively couple with the additional resource to operate within the local resource pool of the compute device; and communicatively coupling, using the connection data, the compute device with the additional resource; and wherein causing the portion of the workload to be executed includes executing the workload using the local resource pool including the additional resource.

In Example 13, the subject matter of Example 12 includes, wherein communicatively coupling the compute device with the additional resource includes communicatively coupling the compute device with at least one of a compute resource, an accelerator resource, or a data storage resource.

In Example 14, the subject matter of Examples 9-13 includes, providing, to the orchestrator logic, system-level conditions for the local resource pool.

In Example 15, the subject matter of Examples 9-14 includes, wherein the workload-based conditions include at least one of latency requirements of the workload, a service level agreement related to the workload, a quality of service (QoS) agreement related to the workload, a time to complete the workload, power requirements for the workload, or location requirements for the workload.

In Example 16, the subject matter of Examples 9-15 includes, executing a remaining portion of the workload using the local resource pool.

Example 17 is at least one non-transitory machine-readable medium including instructions for configuring a compute device including a local resource pool to execute a workload in an edge network, the instructions, when executed, causing processing circuitry to: receive execution conditions for the workload; access capacity of the local resource pool, the capacity including available power to the local resource pool; determine whether the capacity is sufficient to execute the workload based on the execution conditions for the workload; provide, to an orchestrator logic unit in response to a determination that the capacity is insufficient to execute the workload, a request to augment the local resource pool with resources of a remote resource pool; receive, from the orchestrator logic unit, information indicative of an additional resource of the remote resource pool within the network outside the compute device; and cause a portion of the workload to be executed using the additional resource.

In Example 18, the subject matter of Example 17 includes, wherein the workload is executed entirely using the additional resource without using the local resource pool.

In Example 19, the subject matter of Examples 17-18 includes, wherein the compute device is a node of a distributed autonomously powered system and the additional resource is on a remote server.

In Example 20, the subject matter of Examples 17-19 includes, wherein the instructions further cause the processing circuitry to: receive, from the orchestrator logic unit, connection data usable to communicatively couple with the additional resource to operate within the local resource pool of the compute device; and communicatively couple, using the connection data, the compute device with the additional resource; and wherein to cause the portion of the workload to be executed, the instructions further cause the processing circuitry to execute the workload using the local resource pool including the additional resource.

In Example 21, the subject matter of Example 20 includes, wherein to communicatively couple the compute device with the additional resource, the instructions further cause the processing circuitry to communicatively couple the compute device with at least one of a compute resource, an accelerator resource, or a data storage resource.

In Example 22, the subject matter of Examples 17-21 includes, wherein the instructions further cause the processing circuitry to provide, to the orchestrator logic, system-level conditions for the local resource pool.

In Example 23, the subject matter of Examples 17-22 includes, wherein the workload-based conditions include at least one of latency requirements of the workload, a service level agreement related to the workload, a quality of service (QoS) agreement related to the workload, a time to complete the workload, power requirements for the workload, or location requirements for the workload.

In Example 24, the subject matter of Examples 17-23 includes, wherein the instructions further cause the processing circuitry to execute a remaining portion of the workload using the local resource pool.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A compute device operable in an edge network, the compute device including a local resource pool to execute a workload in the edge network, the compute device comprising:
    processing circuitry to:
        receive execution conditions for the workload;
        access capacity of the local resource pool, the capacity including available power supply to the local resource pool;
        determine whether the capacity including the available power supply is sufficient to execute the workload based on the execution conditions for the workload;
        provide, to an orchestrator logic unit in response to a determination that the available power is insufficient to execute the workload, a request to augment the local resource pool with resources of a remote resource pool that is independently powered;
        receive, from the orchestrator logic unit, information indicative of an additional resource of the remote resource pool within the network outside the compute device; and
        cause a first portion of the workload to be executed using the additional resource, wherein the available power supply is sufficient to execute a second portion of the workload after removing the first portion of the workload.

2. The compute device of claim 1, wherein the workload is executed entirely using the additional resource without using the local resource pool.

3. The compute device of claim 1, wherein the compute device is a node of a distributed autonomously powered system and the additional resource is on a remote server.

4. The compute device of claim 1, wherein the processing circuitry is further configured to:
    receive, from the orchestrator logic unit, connection data usable to communicatively couple with the additional resource to operate within the local resource pool of the compute device; and
    communicatively couple, using the connection data, the compute device with the additional resource;
    wherein to cause the first portion of the workload to be executed, the processing circuitry is configured to execute the workload using the local resource pool including the additional resource.

5. The compute device of claim 4, wherein to communicatively couple the compute device with the additional resource, the processing circuitry is further configured to communicatively couple the compute device with at least one of a compute resource, an accelerator resource, or a data storage resource.

6. The compute device of claim 1, wherein the processing circuitry is further configured to provide, to the orchestrator logic, system-level conditions for the local resource pool.

7. The compute device of claim 1, wherein the workload-based conditions include at least one of latency requirements of the workload, a service level agreement related to the workload, a quality of service (QoS) agreement related to the workload, a time to complete the workload, power requirements for the workload, or location requirements for the workload.

8. The compute device of claim 1, wherein the processing circuitry is further configured to execute a remaining portion of the workload using the local resource pool.

9. A method of configuring a compute device including a local resource pool to execute a workload in an edge network, the method comprising:
    receiving execution conditions for the workload;
    accessing capacity of the local resource pool, the capacity including available supply of power to the local resource pool;
    determining, using a processor, whether the capacity including the available supply of power is sufficient to execute the workload based on the execution conditions for the workload;
    providing, to an orchestrator logic unit in response to a determination that the available supply of power is insufficient to execute the workload, a request to augment the local resource pool with resources of a remote resource pool that is independently powered;

receiving, from the orchestrator logic unit, information indicative of an additional resource of the remote resource pool within the network outside the compute device; and causing a first portion of the workload to be executed using the additional resource, wherein the available supply of power is sufficient to execute a second portion of the workload after removing the first portion of the workload.

10. The method of claim 9, wherein the workload is executed entirely using the additional resource without using the local resource pool.

11. The method of claim 9, wherein the compute device is a node of a distributed autonomously powered system and the additional resource is on a remote server.

12. The method of claim 9, further comprising:

receiving, from the orchestrator logic unit, connection data usable to communicatively couple with the additional resource to operate within the local resource pool of the compute device; and communicatively coupling, using the connection data, the compute device with the additional resource; and wherein causing the first portion of the workload to be executed includes executing the workload using the local resource pool including the additional resource.

13. The method of claim 12, wherein communicatively coupling the compute device with the additional resource includes communicatively coupling the compute device with at least one of a compute resource, an accelerator resource, or a data storage resource.

14. The method of claim 9, further comprising providing, to the orchestrator logic, system-level conditions for the local resource pool.

15. The method of claim 9, wherein the workload-based conditions include at least one of latency requirements of the workload, a service level agreement related to the workload, a quality of service (QoS) agreement related to the workload, a time to complete the workload, power requirements for the workload, or location requirements for the workload.

16. The method of claim 9, further comprising executing a remaining portion of the workload using the local resource pool.

17. At least one non-transitory machine-readable medium including instructions for configuring a compute device including a local resource pool to execute a workload in an edge network, the instructions, when executed, causing processing circuitry to:

receive execution conditions for the workload;

access capacity of the local resource pool, the capacity including available power supply to the local resource pool;

determine whether the capacity including the available power supply is sufficient to execute the workload based on the execution conditions for the workload;

provide, to an orchestrator logic unit in response to a determination that the available power supply is insufficient to execute the workload, a request to augment the local resource pool with resources of a remote resource pool that is independently powered;

receive, from the orchestrator logic unit, information indicative of an additional resource of the remote resource pool within the network outside the compute device; and cause a first portion of the workload to be executed using the additional resource, wherein the available power supply is sufficient to execute a second portion of the workload after removing the first portion of the workload.

18. The machine-readable medium of claim 17, wherein the workload is executed entirely using the additional resource without using the local resource pool.

19. The machine-readable medium of claim 17, wherein the compute device is a node of a distributed autonomously powered system and the additional resource is on a remote server.

20. The machine-readable medium of claim 17, wherein the instructions further cause the processing circuitry to:

receive, from the orchestrator logic unit, connection data usable to communicatively couple with the additional resource to operate within the local resource pool of the compute device; and communicatively couple, using the connection data, the compute device with the additional resource; and wherein to cause the first portion of the workload to be executed, the instructions further cause the processing circuitry to execute the workload using the local resource pool including the additional resource.

21. The machine-readable medium of claim 20, wherein to communicatively couple the compute device with the additional resource, the instructions further cause the processing circuitry to communicatively couple the compute device with at least one of a compute resource, an accelerator resource, or a data storage resource.

22. The machine-readable medium of claim 17, wherein the instructions further cause the processing circuitry to provide, to the orchestrator logic, system-level conditions for the local resource pool.

23. The machine-readable medium of claim 17, wherein the workload-based conditions include at least one of latency requirements of the workload, a service level agreement related to the workload, a quality of service (QoS) agreement related to the workload, a time to complete the workload, power requirements for the workload, or location requirements for the workload.

24. The machine-readable medium of claim 17, wherein the instructions further cause the processing circuitry to execute a remaining portion of the workload using the local resource pool.

* * * * *